(12) United States Patent
Kohen

(10) Patent No.: US 8,556,221 B2
(45) Date of Patent: Oct. 15, 2013

(54) ROLLER MOUNT FOR SEAT

(75) Inventor: Robert M Kohen, Tampa, FL (US)

(73) Assignee: Taco Metals, Inc., Miami, FL (US)

( * ) Notice: Subject to any disclaimer, the term of this patent is extended or adjusted under 35 U.S.C. 154(b) by 289 days.

(21) Appl. No.: 12/927,126

(22) Filed: Nov. 8, 2010

(65) Prior Publication Data

US 2012/0112032 A1  May 10, 2012

(51) Int. Cl.
*F16M 13/00* (2006.01)
(52) U.S. Cl.
USPC ......... 248/430; 248/429; 248/424; 296/65.01
(58) Field of Classification Search
USPC .................... 248/430, 429, 424; 296/65.14
See application file for complete search history.

(56) References Cited

U.S. PATENT DOCUMENTS

| | | | |
|---|---|---|---|
| 3,286,971 A | 11/1966 | Walter | |
| 4,511,187 A * | 4/1985 | Rees | 248/430 |
| 4,756,503 A | 7/1988 | Fujita | |
| 4,901,421 A * | 2/1990 | Takarabe et al. | 248/430 |
| 5,172,882 A | 12/1992 | Nini | |
| 5,286,076 A * | 2/1994 | DeVoss et al. | 296/65.14 |
| 5,350,148 A | 9/1994 | Yamamura | |
| 5,564,315 A | 10/1996 | Schuler | |
| 5,582,381 A * | 12/1996 | Graf et al. | 248/430 |
| 5,741,000 A * | 4/1998 | Goodbred | 248/430 |
| 6,089,521 A | 7/2000 | Tarusawa | |
| 6,416,130 B2 | 7/2002 | Yamada | |
| 6,460,818 B1 | 10/2002 | Garelick | |
| 6,874,747 B2 | 4/2005 | Oh | |
| 2012/0074288 A1 * | 3/2012 | Yamada et al. | 248/430 |

* cited by examiner

*Primary Examiner* — Anita M King
(74) *Attorney, Agent, or Firm* — Andrew W. Ludy

(57) ABSTRACT

A roller mount for seats is used for mounting a seat in a boat. A track is mounted on a base plate in the boat. The Y-shaped track has flanges, a transverse web, and a central pillar. The flanges have slots with detent bores.
An inverted U-shaped carriage rides on the track. The carriage has a transverse web and two flanges with detent holes. The carriage has two upper lateral channels facing downward, two lower lateral channels facing upward, and two medial channels facing inward. A plurality of upper transverse rollers is mounted for rotation on axles in the upper lateral channels. Lower transverse rollers are mounted on axles in the lower lateral channels. Vertical rollers are mounted on axles in the medial channels.
A top plate is mounted on the carriage to support the seat. A second track, allowing a wider seat, can be mounted on the base plate spaced apart from the first track. A detent locks the seat in the selected position. The detent has conical collars biased by a spring into the track detent bores. The detent collars are mounted on a shaft sliding in shaft supports.

20 Claims, 16 Drawing Sheets

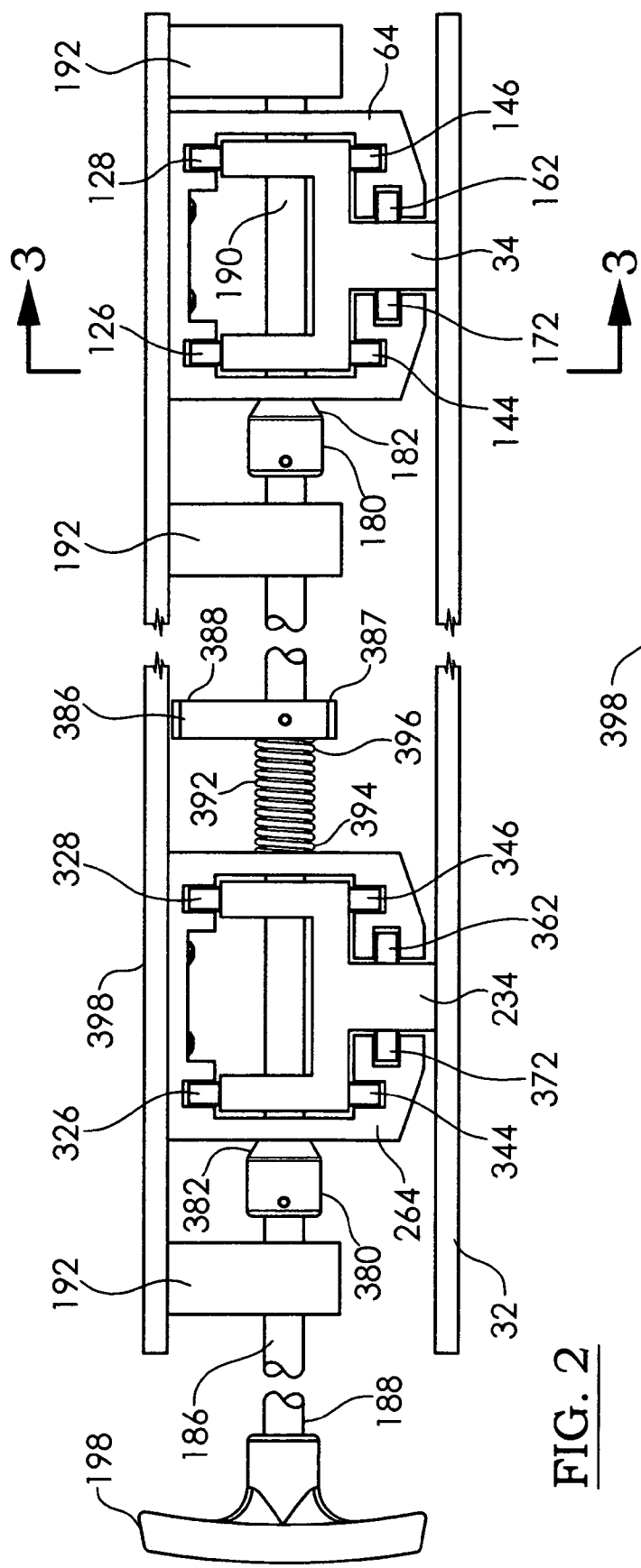
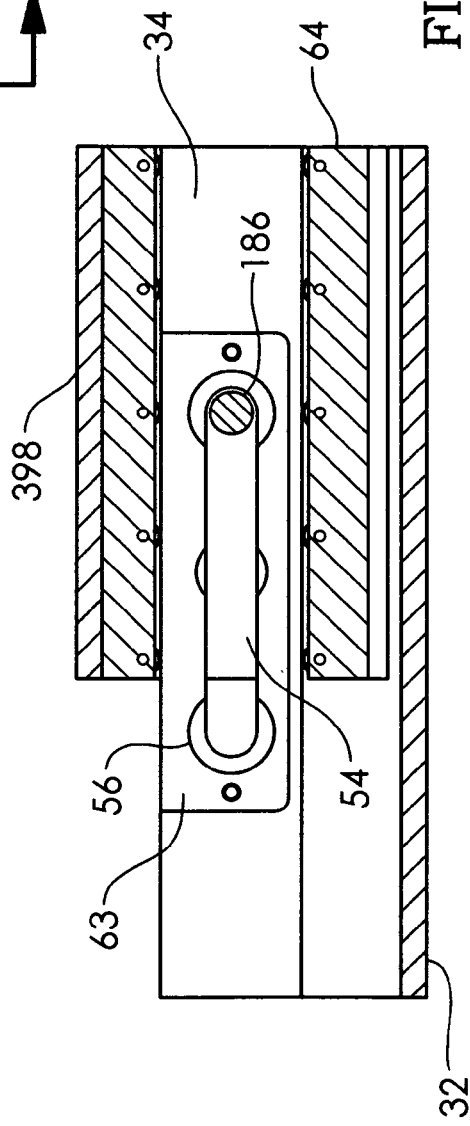
FIG. 2
FIG. 3

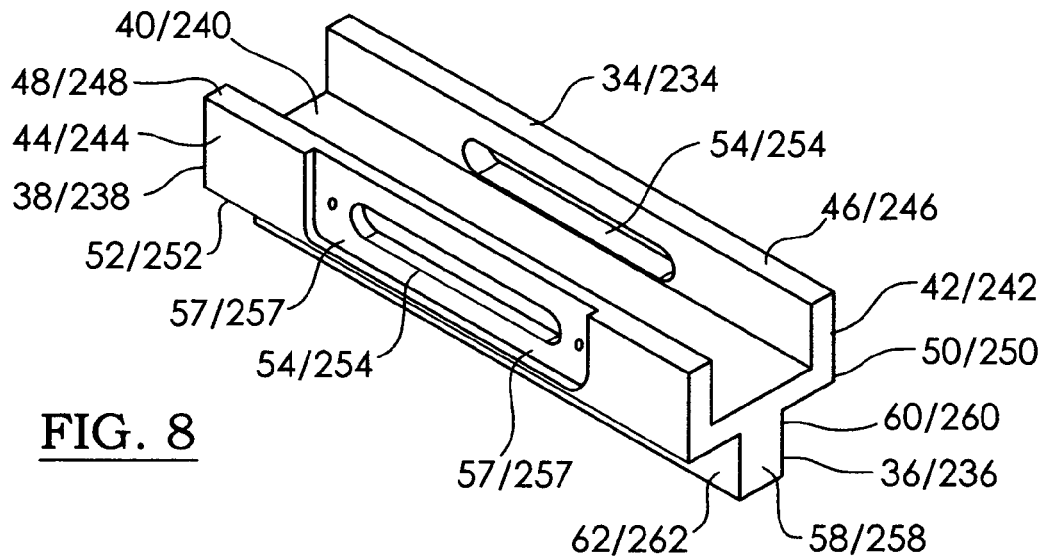
FIG. 8
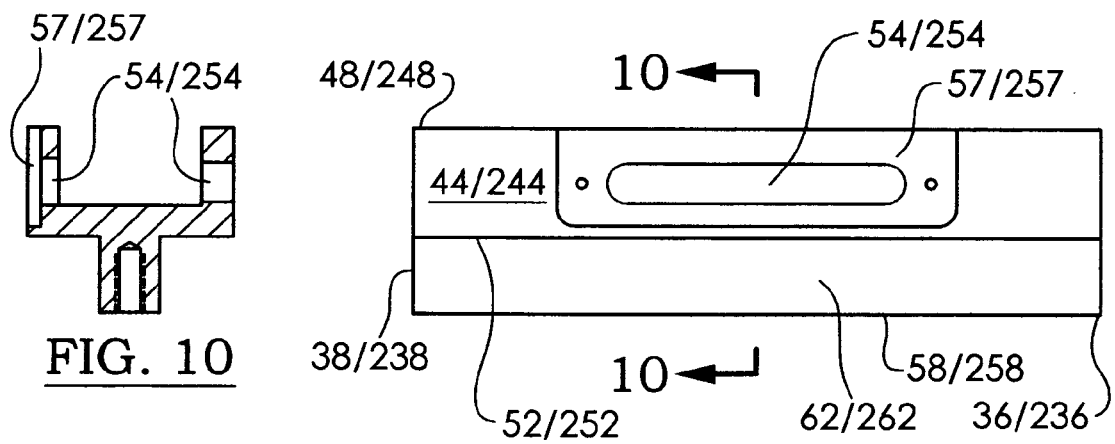
FIG. 10
FIG. 9
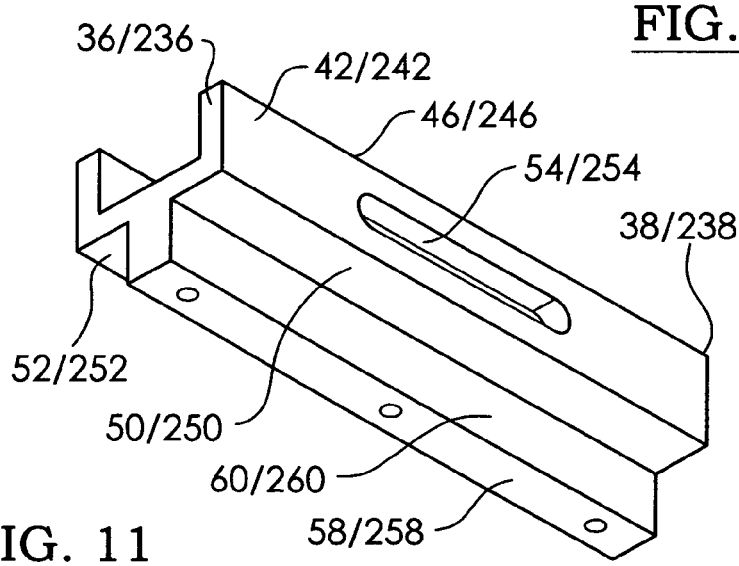
FIG. 11

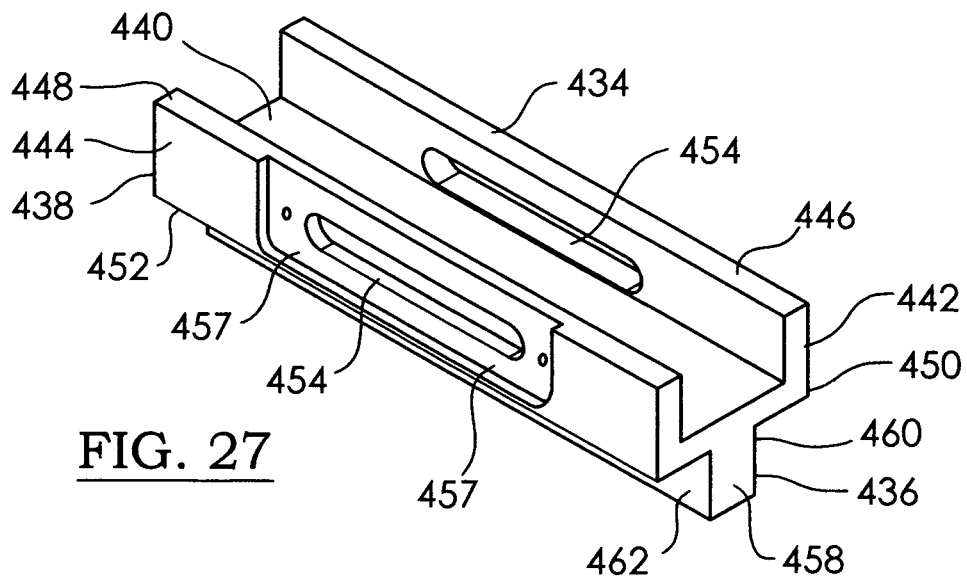
FIG. 27
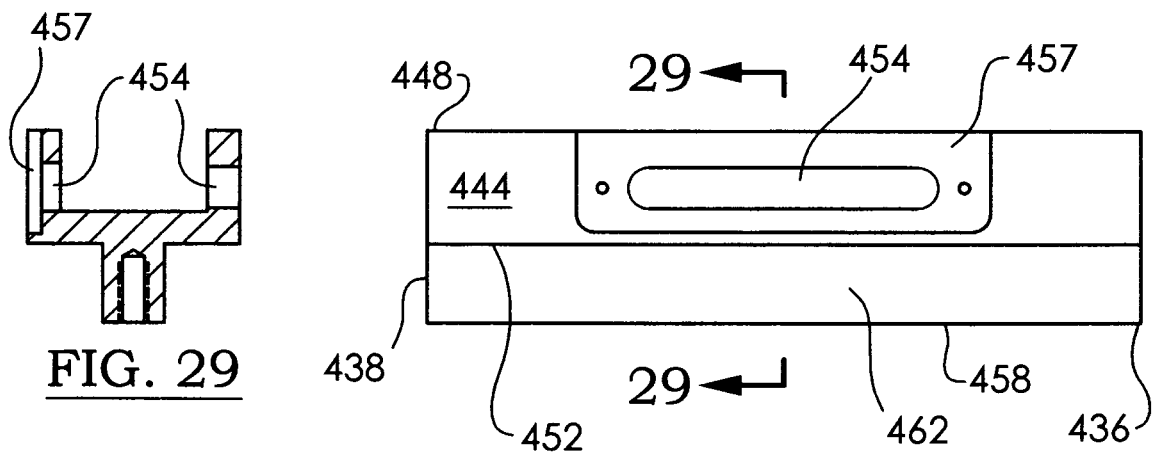
FIG. 29
FIG. 28
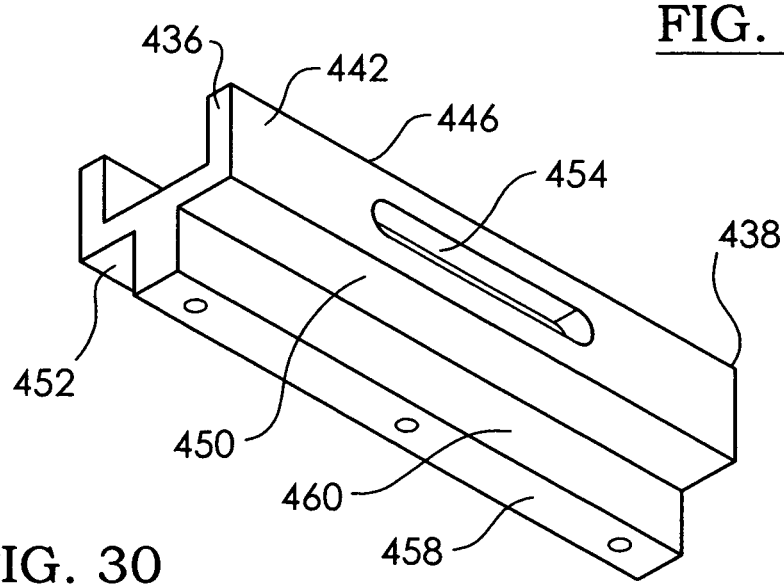
FIG. 30

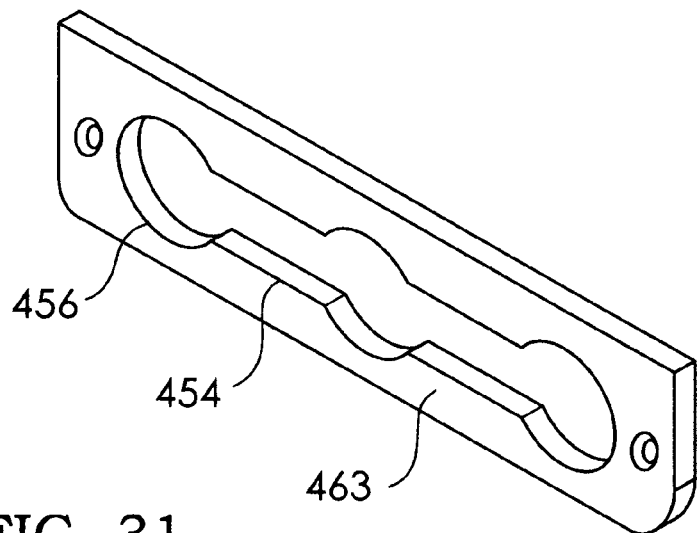
FIG. 31
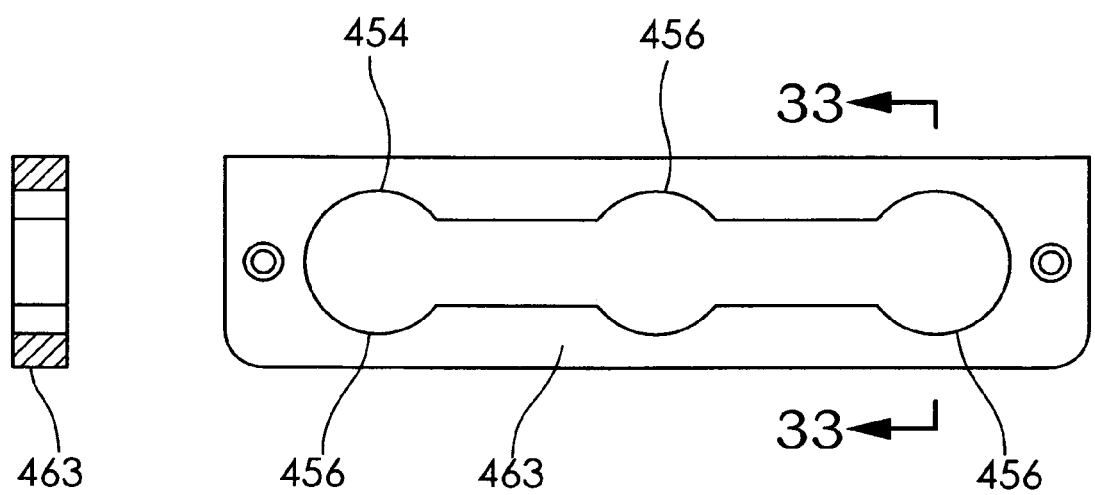
FIG. 33
FIG. 32

ROLLER MOUNT FOR SEAT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates to the field of sliding and rolling seat mounts, and more particularly to a rolling mount with a selective detent for use in connection with a boat seat.

It is desirable to be able to adjust a vehicle seat forward and backward in order to accommodate occupants of varying height. In the case of a boat, this is often necessary while underway, so that the driver can more easily slide out from behind the steering wheel to attend to an emergency issue, or allow another to drive. The seat must slide or roll freely, yet be held securely in any desired detent position. The detent must release easily, yet not be loosened by the motion of the boat in a seaway (rough water due to weather), and with a heavy driver. The roller mount must be able to withstand the rigors of marine service and a corrosive environment. It also must be capable of mounting a double or triple width seat, as is often found in marine practice. This requires two tracks spaced apart, each with a detent mechanism having no backlash, so as to preclude vibration and rattling. A potential problem with relatively short, parallel tracks set apart is binding while sliding. Rolling element bearings properly deployed can prevent binding.

Marine seats, as well as all marine systems, must withstand forces generated by the six ship motions: roll (rotation about a longitudinal axis); pitch (rotation about a transverse axis); yaw (rotation about a vertical axis); surge (translation along a longitudinal axis); sway (translation along a transverse axis); and heave (translation along a vertical axis). Add to this, sudden acceleration down the face of a wave, or deceleration crashing into a wave.

Vehicle sliding and rolling seat mounts are known in the prior art, especially in automotive practice. Some examples are as follows:

Yamada, U.S. Pat. No. 6,416,130; discloses a track assembly with a roller bearing carrying the load, and upper portions of both slides in sliding contact on ridges for reduced friction and spring bias to take up backlash. The ridges would create too much friction for a marine application. The spring bias feature would not withstand the impact of a boat in a seaway.

Tarusawa, U.S. Pat. No. 6,089,521; Fujita, U.S. Pat. No. 4,756,503; and Yamamura, U.S. Pat. No. 5,350,148; all show various ball bearing and roller bearing slide assemblies. The rolling elements support the slide in downward vertical loading only. For marine service, the slide mount requires rolling element support in both upward and downward vertical loading, and in left and right transverse loading. Anything less would not operate smoothly subject to the six ship motions.

Oh, U.S. Pat. No. 6,874,747; Walter, U.S. Pat. No. 3,286,971; Schuler, U.S. Pat. No. 5,564,315; and Nini, U.S. Pat. No. 5,172,882; each shows a tapered locking pin arrangement. The above devices have no provision to eliminate backlash in the case of two tracks spaced apart, each with a detent mechanism.

Accordingly, there is a need to provide a roller mount for seats that has rolling element support in both upward and downward vertical loading, and in left and right transverse loading.

There is a further need to provide a roller mount for seats of the type described and that exhibits no backlash in the case of two tracks spaced apart, each with a detent mechanism.

There is a yet further need to provide a roller mount for seats of the type described and that will withstand forces generated by the six ship motions in a seaway.

There is a still further need to provide a roller mount for seats of the type described and that is capable of mounting a double or triple width seat, and yet will not bind while sliding.

There is another need to provide a roller mount for seats of the type described and that can withstand the rigors of marine service and a corrosive environment.

There is yet another need to provide a roller mount for seats of the type described and that can be manufactured cost-effectively in large quantities of high quality.

BRIEF SUMMARY OF THE INVENTION

In accordance with the present invention, there is provided a roller mount for seats 30, for use in connection with a boat and a seat (not shown). A base plate 32 is mounted in the boat. A first track 34 is mounted on the base plate 32. The first track 34 has a generally Y-shaped cross-section and a transverse track web 40. The first track has opposite left 42 and right 44 flanges extending upward from the track web 40. The left 42 and right 44 track flanges each have a track slot 54 through each flange. Either one of the left 42 and right 44 track flanges has a plurality of first track detent bores 56 in the track slot 54. The first track detent bores 56 have a predetermined diameter. The first track 34 has a central track pillar 58 with a left side 60 and a right side 62.

A first carriage 64 partially surrounds and rolls upon the first track 34. The first carriage 64 has a generally inverted U-shaped cross-section with a transverse carriage web 70. The first carriage has opposite left 72 and right 74 carriage flanges extending downward from the transverse carriage web 70. The left 72 and right 74 carriage flanges have a left 84 and right 86 carriage detent hole respectively through the flanges. The first carriage 64 has an upper right lateral channel 88 and an upper left lateral channel 94, each with an inner and an outer leg, the channels facing downward.

The first carriage 64 has a lower right lateral channel 100 and a lower left lateral channel 106, each with an inner and an outer leg, the channels facing upward.

The first carriage 64 has a right medial channel 112 and a left medial channel 118, each with an inner and an outer leg, the channels facing inward. Each channel extends longitudinally between the carriage front and rear ends.

A plurality of upper rolling elements 124 are mounted on the first carriage 64, bearing downward against the first track flanges. The upper rolling elements 124 include upper right 126 and upper left 128 transverse rollers and axles. The axles 134 and 136 are press fit into axle holes, which are perpendicular to the channels. The rollers 126 and 128 are mounted for rotation on the axles between the inner leg and the outer leg of the channels.

A plurality of lower rolling elements 142 are mounted on the first carriage 64, bearing upward against the first track flanges. The lower rolling elements 142 include lower right 144 and lower left 146 transverse rollers and axles. The axles 152 and 154 are press fit into axle holes, which are perpendicular to the channels. The rollers 144 and 146 are mounted for rotation on the axles between the inner leg and the outer leg of the channels.

A plurality of left rolling elements 160 are mounted on the first carriage 64, bearing rightward against the first track pillar left side 60. The left rolling elements 160 include left vertical rollers 162 and axles. The axles 166 are press fit into axle holes, which are perpendicular to the channels. The left vertical rollers 162 are mounted for rotation on the axles between the inner leg and the outer leg of the channels.

A plurality of right rolling elements 170 are mounted on the first carriage 64, bearing leftward against the first track pillar right side 62. The right rolling elements 170 include right vertical rollers 172 and axles. The axles 176 are press fit into axle holes, which are perpendicular to the channels. The right vertical rollers 172 are mounted for rotation on the axles 176. The right vertical rollers 172 are mounted for rotation on the axles between the inner leg and the outer leg of the channels.

In the preferred embodiment, a second track 234 and a second carriage 264 are mounted on the base plate 32 parallel to the first track 34 and spaced apart from the first track 34. The second track 234 and second carriage 264 are identical to the first track 34 and first carriage 64. The extra width provided by the second track allows a seat of sufficient width for two or three people abreast. The rolling elements ensure smooth sliding movement with no jamming. A top plate 398 is mounted on the first 64 and second 264 carriages to support the seat.

A detent is provided for locking the seat in the selected position. The detent has first 180 and second 380 detent collars, each having a conical end 182 and 382 for selective engagement with any one of the track detent bores 56 and 256 respectively. The detent collars are mounted on a shaft 186 slidingly engaging the bushings. A spring biases the detent collars into the track detent bores.

BRIEF DESCRIPTION OF THE SEVERAL VIEWS OF THE DRAWING

A more complete understanding of the present invention may be obtained from consideration of the following description in conjunction with the drawing, in which:

FIG. 2 is a front view of the roller mount for seats of FIG. 1.

FIG. 3 is a left elevational sectional view of the roller mount for seats of FIG. 1, taken along lines 3-3 of FIG. 2.

FIG. 8 is a front perspective view of the track of the roller mount for seats of FIG. 1.

FIG. 9 is a right elevational view of the track of FIG. 8.

FIG. 10 is a front sectional elevational view of the track of FIG. 8, taken along lines 10-10 of FIG. 9, showing the detent slot.

FIG. 11 is bottom perspective view of the track of FIG. 8.

FIG. 27 is a front perspective view of the track of the roller mount for seats of FIG. 25.

FIG. 28 is a right elevational view of the track of FIG. 27.

FIG. 29 is a front sectional elevational view of the track of FIG. 27, taken along lines 29-29 of FIG. 28, showing the detent slot.

FIG. 30 is bottom perspective view of the track of FIG. 27.

FIG. 31 is a top perspective view of a wear plate for the track of FIG. 27.

FIG. 32 is a right elevational view of the wear plate of FIG. 31.

FIG. 33 is a front sectional elevational view of the wear plate of FIG. 31, taken along lines 33-33 of FIG. 32, showing the detent bores.

DETAILED DESCRIPTION OF THE INVENTION

Figure 1:
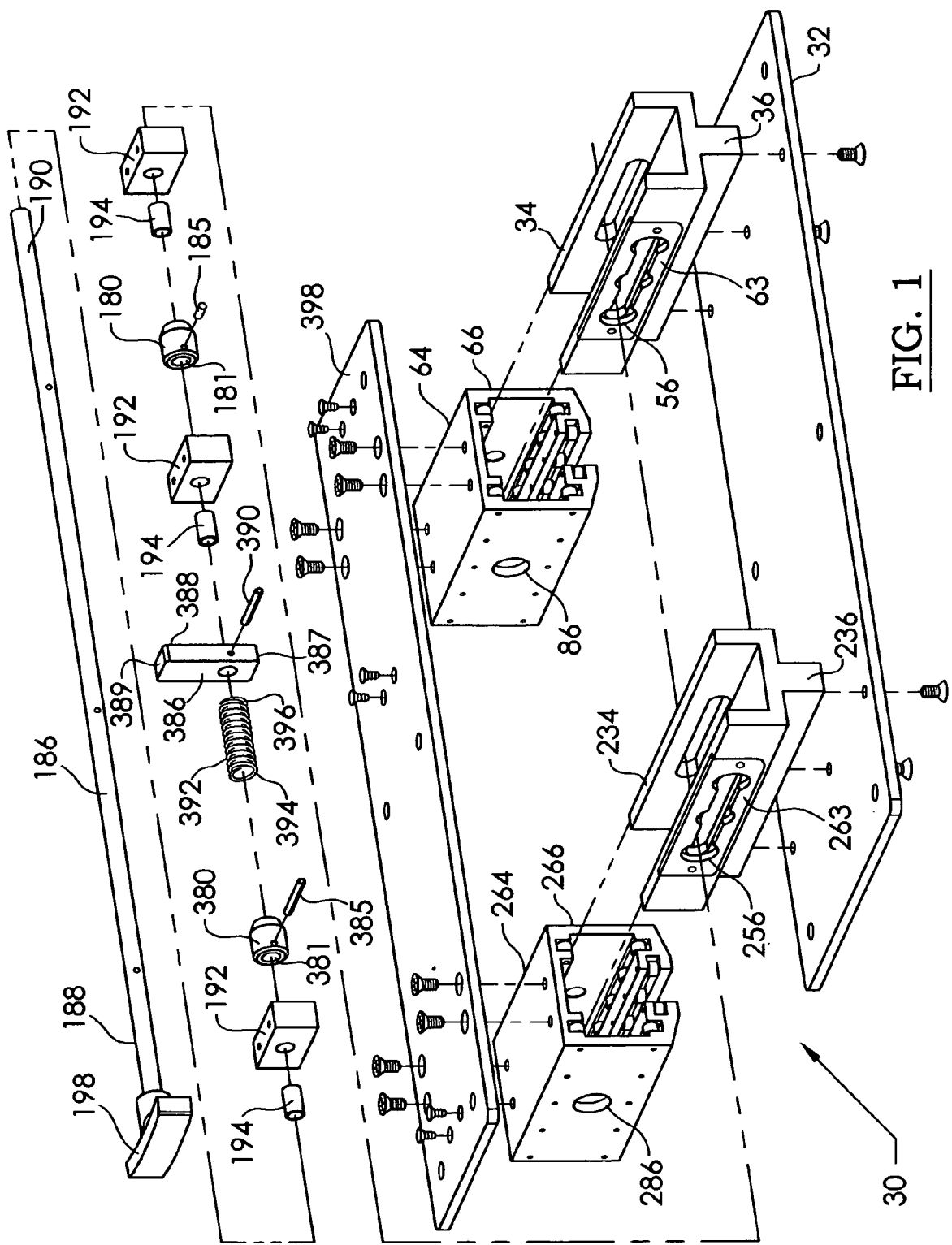
FIG. 1 is an exploded, perspective, assembly view of a roller mount for seats constructed in accordance with the invention.

Referring now to the drawing and especially to FIGS. 1-24 thereof, a roller mount for seats is shown at 30, and is for use in connection with a boat and a seat (not shown). The roller mount for seats comprises a base plate 32 adapted for mounting in the boat. A first track 34 is mounted on the base plate 32. The first track 34 has a generally Y-shaped cross-section extending longitudinally between opposite front 36 and rear 38 ends. The first track 34 has a transverse track web 40. The first track Y-shaped cross-section has opposite left 42 and right 44 track flanges extending upward from the track web 40. The track flanges have a left 46 and right 48 upper edge and a left 50 and right 52 lower edge. The left 42 and right 44 track flanges each have a track slot 54 through each flange. The slots 54 extend longitudinally from adjacent the front end 36 to adjacent the rear end 38. Either one of the left 42 and right 44 track flanges has a plurality of first track detent bores 56 in the track slot 54. The first track detent bores 56 have a predetermined diameter. The first track 34 includes a wear plate 63 mounted into a recess 57 in one of the left 42 and right 44 track flanges. In the preferred embodiment shown, the first track detent bores 56 are disposed in the wear plate 63. Three first track detent bores 56 are shown in the drawings. However, it is to be understood that any number of detent holes can be configured, each representing a seat detent position. The first track 34 has a central track pillar 58. The track pillar 58 has a left side 60 and a right side 62.

A first carriage 64 partially surrounds the first track 34, and is mounted for longitudinal rolling movement on the first track 34. The first carriage 64 has a generally inverted U-shaped cross-section extending longitudinally between opposite front 66 and rear 68 ends. The first carriage 64 has a transverse carriage web 70. The first carriage U-shaped cross-section has opposite left 72 and right 74 carriage flanges extending downward from the transverse carriage web 70. The carriage flanges have a left 76 and right 78 upper edge and a left 80 and right 82 lower edge. The left 72 and right 74 carriage flanges have a left 84 and right 86 carriage detent hole respectively through the flanges. The first carriage 64 has an upper right lateral channel 88 with an inner leg 90 and an outer leg 92, and an upper left lateral channel 94 with an inner leg 96 and an outer leg 98, the channels facing downward.

The first carriage 64 has a lower right lateral channel 100 with an inner leg 102 and an outer leg 104, and a lower left lateral channel 106 with an inner leg 108 and an outer leg 110, the channels facing upward. The first carriage 64 has a right medial channel 112 with an inner leg 114 and an outer leg 116, and a left medial channel 118 with an inner leg 120 and an outer leg 122, the channels facing inward. Each channel extends longitudinally between the carriage front 66 and rear 68 ends.

A plurality of upper rolling elements 124 are mounted on the first carriage 64 for rolling engagement with the first track 34. The upper rolling elements 124 are disposed bearing downward against the first track left flange upper edge 46 and the first track right flange upper edge 48, so as to resist downward forces against the first track 34. The upper rolling elements 124 include upper right 126 and upper left 128 transverse rollers. The rollers 126 and 128 each have a horizontal axis of rotation and an upper right 130 and an upper left 132 hole through the axis respectively. The upper rolling elements 124 have an upper right 134 and an upper left 136 axle for each roller respectively. The inner and outer legs of the upper right lateral channel 88 and the upper left lateral channel 94 have collinear axle holes 138 and 140 respectively, which are perpendicular to the channels. The axles 134 and 136 are closely received in the axle holes 138 and 140 respectively, and are preferably a press fit. The rollers 126 and 128 are mounted for rotation on the axles 134 and 136 respectively. The rollers 126 and 128 are mounted between the inner leg and the outer leg of the upper right lateral channel 88 and the upper left lateral channel 94 respectively.

A plurality of lower rolling elements 142 are mounted on the first carriage 64 for rolling engagement with the first track 34. The lower rolling elements 142 are disposed bearing upward against the first track left flange lower edge 50 and the first track right flange lower edge 52, so as to resist upward forces against the first track 34. The lower rolling elements 142 include lower right 144 and lower left 146 transverse rollers. The rollers 144 and 146 each have a horizontal axis of rotation and a lower right 148 and lower left 150 hole through the axis respectively. The lower rolling elements 142 have a lower right 152 and lower left 154 axle for each roller respectively. The inner and outer legs of the lower right lateral channel 100 and the lower left lateral channel 106 have collinear axle holes 156 and 158 respectively, which are perpendicular to the channels. The axles 152 and 154 are closely received in the axle holes 156 and 158 respectively, and are preferably a press fit. The rollers 144 and 146 are mounted for rotation on the axles 152 and 154 respectively. The rollers 144 and 146 are mounted between the inner leg and the outer leg of the lower right lateral channel 100 and the lower left lateral channel 106 respectively.

A plurality of left rolling elements 160 are mounted on the first carriage 64 for rolling engagement with the first track 34. The left rolling elements 160 are disposed bearing rightward against the first track pillar left side 60, so as to resist rightward forces against the first track 34. The left rolling elements 160 include left vertical rollers 162. The rollers 162 each have a vertical axis of rotation and a hole 164 through the axis. The left rolling elements 162 have an axle 166 for each roller 162. The inner leg and the outer leg of each left medial channel 118 have collinear axle holes 168, which are perpendicular to the channels. The axles 166 are closely received in the axle holes 168, and are preferably a press fit. The left vertical rollers 162 are mounted for rotation on the axles 166. The left vertical rollers 162 are mounted between the inner leg and the outer leg of each left medial channel 118.

A plurality of right rolling elements 170 are mounted on the first carriage 64 for rolling engagement with the first track 34. The right rolling elements 170 are disposed bearing leftward against the first track pillar right side 62, so as to resist leftward forces against the first track 34. The right rolling elements 170 include right vertical rollers 172. The rollers 172 each have a vertical axis of rotation and a hole 174 through the axis. The right rolling elements 170 have an axle 176 for each roller 172. The inner leg and the outer leg of each right medial channel 112 have collinear axle holes 178, which are perpendicular to the channels. The axles 176 are closely received in the axle holes 178, and are preferably a press fit. The right vertical rollers 172 are mounted for rotation on the axles 176. The right vertical rollers 172 are mounted between the inner leg and the outer leg of each right medial channel 112.

In the preferred embodiment, a second track 234 is mounted on the base plate 32 parallel to the first track 34 and spaced apart from the first track 34. The extra width provided by the second track allows a seat of sufficient width for two or three people abreast. The rolling elements ensure smooth rolling movement with no jamming.

The second track 234 has a generally Y-shaped cross-section extending longitudinally between opposite front 236 and rear 238 ends. The second track 234 has a transverse track web 240. The second track Y-shaped cross-section has opposite left 242 and right 244 track flanges extending upward from the track web 240. The track flanges have a left 246 and right 248 upper edge and a left 250 and right 252 lower edge. The left 242 and right 244 track flanges each have a track slot 254 through each flange. The slots 254 extend longitudinally from adjacent the front end 236 to adjacent the rear end 238. Either one of the left 242 and right 244 track flanges has a plurality of second track detent bores 256 in the track slot 254. In the preferred embodiment shown, the second track detent bores 256 are disposed in the right track flange 244. The second track detent bores 256 have the same diameter as the first track detent bores 56. The second track 234 includes a wear plate 263 mounted into a recess 257 in one of the left 242 and right 244 track flanges. In the preferred embodiment shown, the second track detent bores 256 are disposed in the wear plate 263. The second track 234 has a central track pillar 258. The track pillar 258 has a left side 260 and a right side 262.

A second carriage 264 partially surrounds the second track 234, and is mounted for longitudinal rolling movement on the second track 234. The second carriage 264 has a generally inverted U-shaped cross-section extending longitudinally between opposite front 266 and rear 268 ends. The second carriage 264 has a transverse carriage web 270. The second carriage U-shaped cross-section has opposite left 272 and right 274 carriage flanges extending downward from the transverse carriage web 270. The carriage flanges have a left 276 and right 278 upper edge and a left 280 and right 282 lower edge. The left 272 and right 274 carriage flanges have a left 284 and right 286 carriage detent hole respectively through the flanges. The second carriage 264 has an upper right lateral channel 288 with an inner leg 290 and an outer leg 292, and an upper left lateral channel 294 with an inner leg 296 and an outer leg 298, the channels facing downward.

The second carriage 264 has a lower right lateral channel 300 with an inner leg 302 and an outer leg 304, and a lower left lateral channel 306 with an inner leg 308 and an outer leg 310, the channels facing upward. The second carriage 264 has a right medial channel 312 with an inner leg 314 and an outer leg 316, and a left medial channel 318 with an inner leg 320 and an outer leg 322, the channels facing inward. Each channel extends longitudinally between the carriage front 266 and rear 268 ends.

A plurality of upper rolling elements 324 are mounted on the second carriage 264 for rolling engagement with the second track 234. The upper rolling elements 324 are disposed bearing downward against the second track left flange upper edge 246 and the second track right flange upper edge 248, so as to resist downward forces against the second track 234. The upper rolling elements 324 include upper right 326 and upper left 328 transverse rollers. The rollers 326 and 328 each have a horizontal axis of rotation and an upper right 330 and an upper left 332 hole through the axis respectively. The upper rolling elements 324 have an upper right 334 and an upper left 336 axle for each roller respectively. The inner and outer legs of the upper right lateral channel 288 and the upper left lateral channel 294 have collinear axle holes 338 and 340 respectively, which are perpendicular to the channels. The axles 334 and 336 are closely received in the axle holes 338 and 340 respectively, and are preferably a press fit. The rollers 326 and 328 are mounted for rotation on the axles 334 and 336 respectively. The rollers 326 and 328 are mounted between the inner leg and the outer leg of the upper right lateral channel 288 and the upper left lateral channel 294 respectively.

A plurality of lower rolling elements 342 are mounted on the second carriage 264 for rolling engagement with the second track 234. The lower rolling elements 342 are disposed bearing upward against the second track left flange lower edge 250 and the second track right flange lower edge 252, so as to resist upward forces against the second track 234. The lower rolling elements 342 include lower right 344 and lower left 346 transverse rollers. The rollers 344 and 346 each have a horizontal axis of rotation and a lower right 348 and lower left 350 hole through the axis respectively. The lower rolling elements 342 have a lower right 352 and lower left 354 axle for each roller respectively. The inner and outer legs of the lower right lateral channel 300 and the lower left lateral channel 306 have collinear axle holes 356 and 358 respectively, which are perpendicular to the channels. The axles 352 and 354 are closely received in the axle holes 356 and 358 respectively, and are preferably a press fit. The rollers 344 and 346 are mounted for rotation on the axles 352 and 354 respectively. The rollers 344 and 346 are mounted between the inner leg and the outer leg of the lower right lateral channel 300 and the lower left lateral channel 306 respectively.

A plurality of left rolling elements 360 are mounted on the second carriage 264 for rolling engagement with the second track 234. The left rolling elements 360 are disposed bearing rightward against the second track pillar left side 260, so as to resist rightward forces against the second track 234. The left rolling elements 360 include left vertical rollers 362. The rollers 362 each have a vertical axis of rotation and a hole 364 through the axis. The left rolling elements 362 have an axle 366 for each roller 362. The inner leg and the outer leg of each left medial channel 318 have collinear axle holes 368, which are perpendicular to the channels. The axles 366 are closely received in the axle holes 368, and are preferably a press fit. The left vertical rollers 362 are mounted for rotation on the axles 366. The left vertical rollers 362 are mounted between the inner leg and the outer leg of each left medial channel 318.

A plurality of right rolling elements 370 are mounted on the second carriage 264 for rolling engagement with the second track 234. The right rolling elements 370 are disposed bearing leftward against the second track pillar right side 262, so as to resist leftward forces against the second track 234. The right rolling elements 370 include right vertical rollers 372. The rollers 372 each have a vertical axis of rotation and a hole 374 through the axis. The right rolling elements 370 have an axle 376 for each roller 372. The inner leg and the outer leg of each right medial channel 312 have collinear axle holes 378, which are perpendicular to the channels. The axles 376 are closely received in the axle holes 378, and are preferably a press fit. The right vertical rollers 372 are mounted for rotation on the axles 376. The right vertical rollers 372 are mounted between the inner leg and the outer leg of each right medial channel 312.

A top plate 398 is mounted on the first 64 and 264 second carriages, connecting them together. The top plate 398 is adapted to support the seat.

A detent is provided for locking the seat in the selected position. The detent has a first detent collar 180 disposed for sliding movement in the first carriage right detent hole 86. The first detent collar 180 is adapted for selective releasable engagement with any one of the first track detent bores 56. The detent has a second detent collar 380 disposed for sliding movement in the second carriage right detent hole 286. The second detent collar 380 is adapted for selective releasable engagement with any one of the second track detent bores 256.

Each detent collar 180 and 380 is a cylinder with a diameter greater than that of the track detent bores 56 and 256. Each detent collar 180 and 380 has a conical end 182 and 382 respectively tapering to a frustrum of a cone for selective engagement with any one of the track detent bores 56 and 256. An optional ring 183 and 383 is pressed onto the conical end 182 and 382 respectively of each collar 180 and 380. The rings 183 and 383 are made of a polymer and serve to grip the track detent bores 56 and 256 to minimize slippage. Each detent collar 180 and 380 has a longitudinal hole 181 and 381 respectively through the center of the collar 180 and 380. The detent has a shaft 186 extending between opposite right 188 and left 190 ends. Starting at the right end 188, the detent shaft 186 extends collinearly through the hole 381 in the second detent collar 380. The shaft 186 continues, extending through the second carriage right detent hole 286, and through both of the second track slots 254. The detent shaft 186 extends collinearly through the hole 181 in the first detent collar 180. The shaft 186 extends through the first carriage right detent hole 86, and through both of the first track slots 54.

The first detent collar 180 has a hole 184 extending transversely through the first detent collar 180. The hole 184 is threaded to receive a threaded first transverse fastener 185, namely a set screw. The second detent collar 380 has a hole 384 extending transversely through the second detent collar 380. The hole 384 receives a second transverse fastener 385, preferably a roll pin, for mounting the second detent collar 380 in a fixed position on the shaft 186. Upon assembly, the second detent collar 380 is closely received in one of the second track detent bores 256, then the first detent collar 180 is pushed into the corresponding first track detent bore 56, and the set screw 185 is tightened, assuring that the first and second detents will fully engage simultaneously without backlash.

The detent has a spring 392 to bias the first and second detent collar conical ends 182 and 382 releasably into engagement with one of the second track detent bores 56 and 256 respectively. The spring 392 extends between opposite right 394 and left 396 ends. The second spring 392 has a predetermined biasing force.

A stop block 386 is a mounted on the shaft 186 between the first carriage 64 and the second carriage 264. The stop block 386 extends from a proximal end 387 upward to a distal end 388. The distal end 388 has a flat 389 juxtaposed with the top plate 398 to preclude the shaft 186 from rotating. The left end 396 of the second spring 392 bears against the stop block 386. The right end 394 of the second spring 392 bears against the second carriage 264. A plurality of shaft supports 192 with shaft support bushings 194 are disposed along the shaft 186 and are fastened to the top plate 398.

Figure 4:
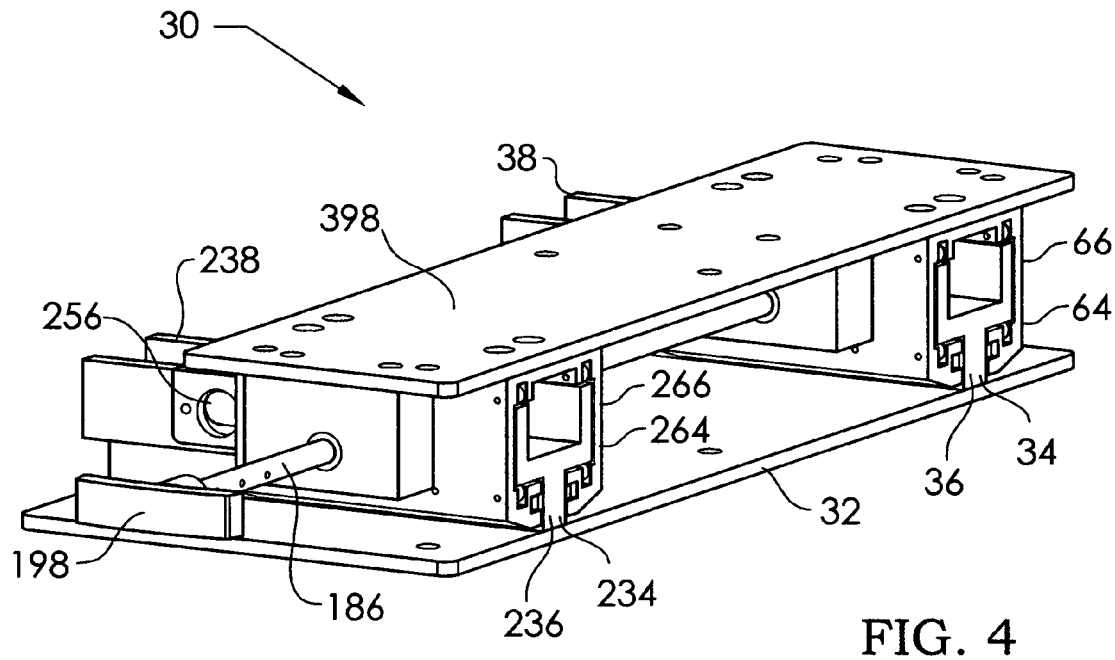
FIG. 4 is a perspective, assembly view of the roller mount for seats of FIG. 1, showing the roller mount for seats in the front detent position.
Figure 5:
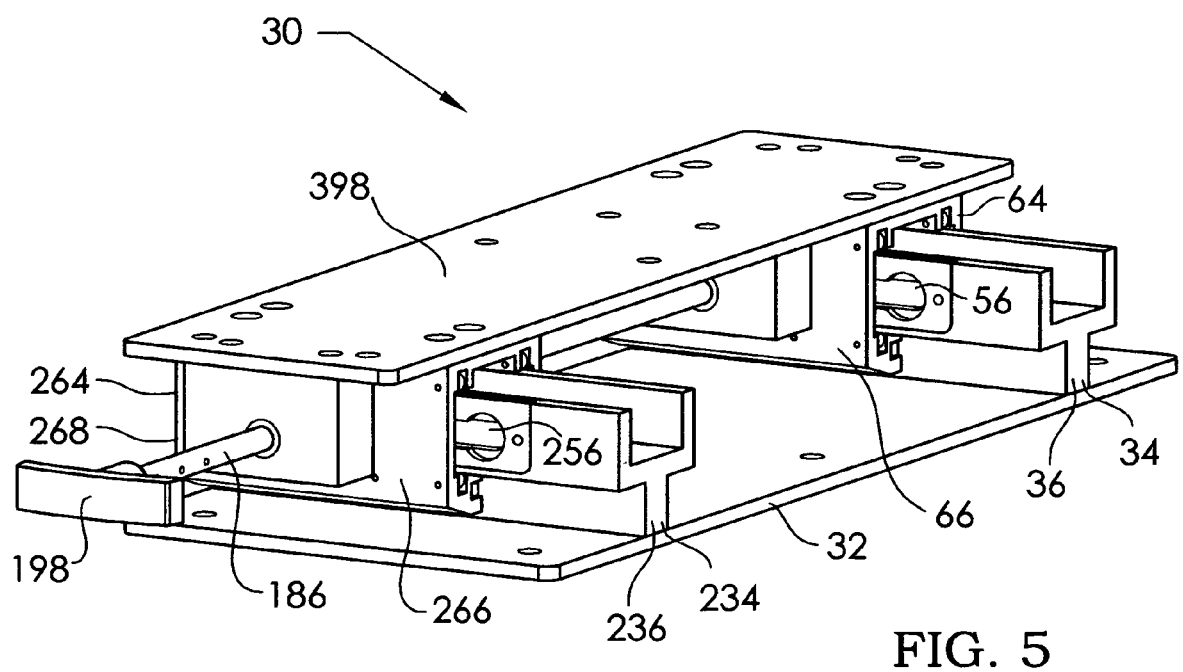
FIG. 5 is a perspective, assembly view of the roller mount for seats of FIG. 1, showing the roller mount for seats in the rear detent position.
Figure 6:
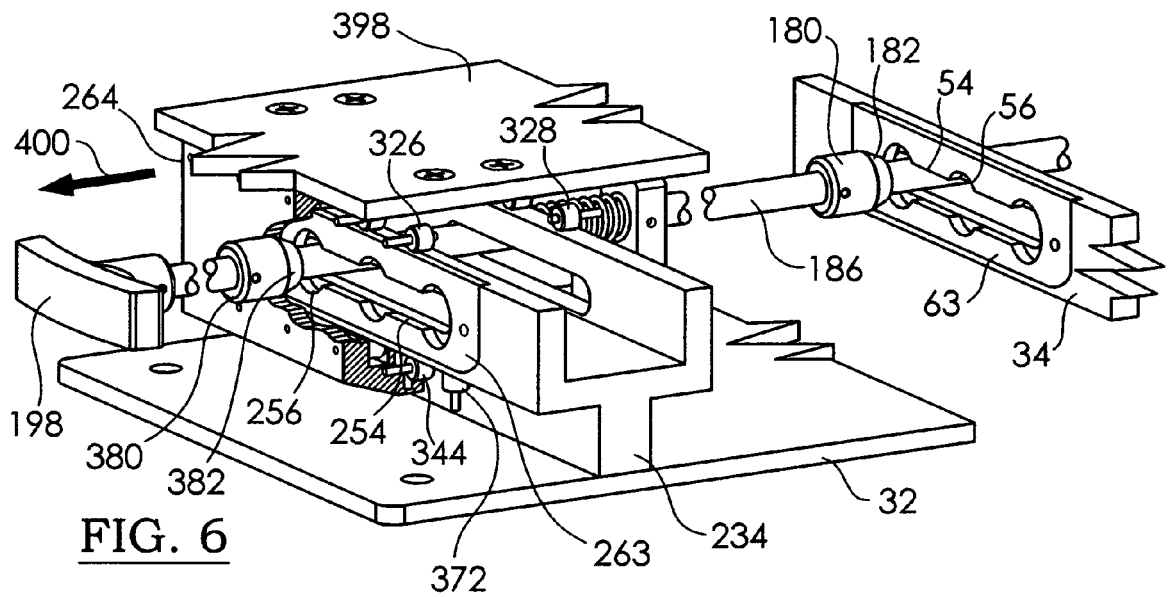
FIG. 6 is a partial, perspective, assembly view of the roller mount for seats of FIG. 1, showing the roller mount for seats in the rear detent position with the detent disengaged.
Figure 7:
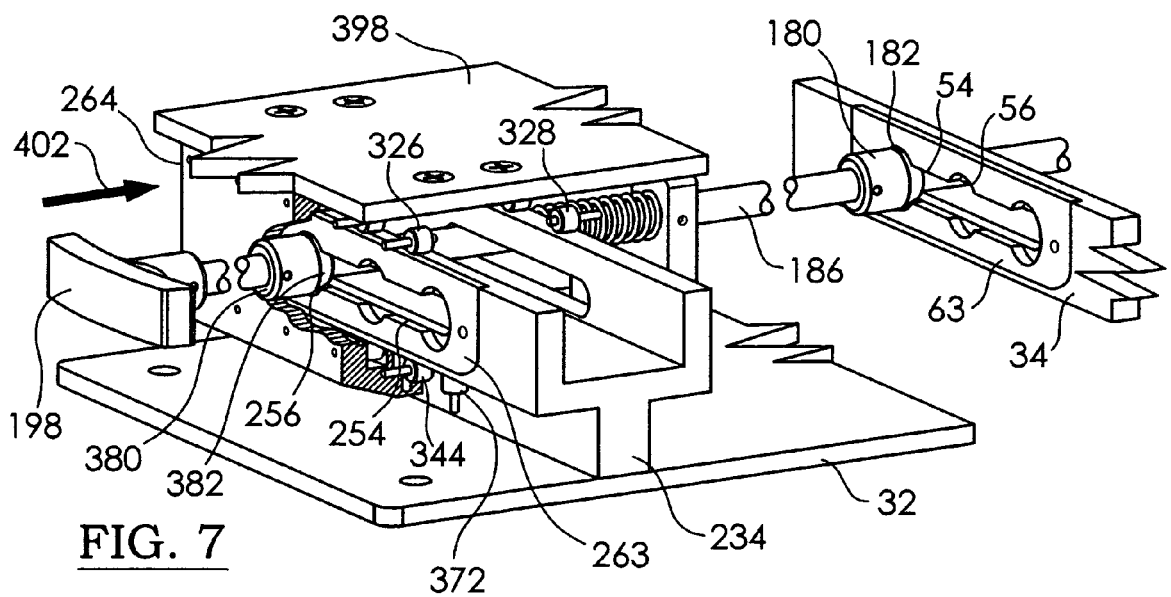
FIG. 7 is a partial, perspective, assembly view of the roller mount for seats of FIG. 1, showing the roller mount for seats in the rear detent position with the detent engaged.

In the preferred embodiment shown, the detent has a handle 198 mounted on the right end 188 of the shaft 186. In use, the handle 198 is pulled outward as shown by arrow 400 in FIG. 6, disengaging the first and second detent collars 180 and 380 from the first and second track detent bores 56 and 256 respectively. The seat is moved forward or aft as desired, as shown in FIGS. 4 and 5, and the handle 198 is released. The spring 392 causes the shaft to move inward as shown by arrow 402 in FIG. 7, and the first and second detent collar conical ends 182 and 382 to be seated in another of the first and second track detent bores 56 and 256 respectively, thereby locking the seat in the new position. The detent will preclude movement of the carriages 64 and 264 with respect to the tracks 34 and 234 when the detent collars 180 and 380 respectively are engaged. Conversely, the detent will allow movement of the carriages 64 and 264 with respect to the tracks 34 and 234 when the detent collars 180 and 380 respectively are disengaged.

Figure 12:
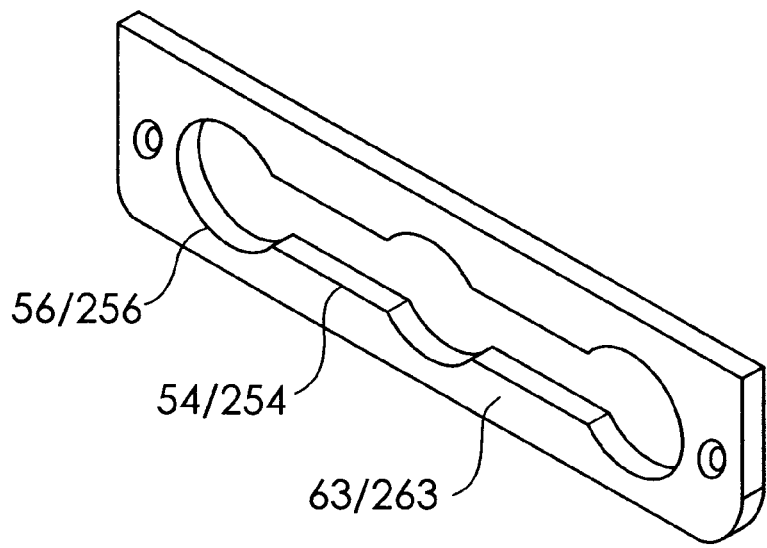
FIG. 12 is a top perspective view of a wear plate for the track of FIG. 8.
Figures 13, 14:
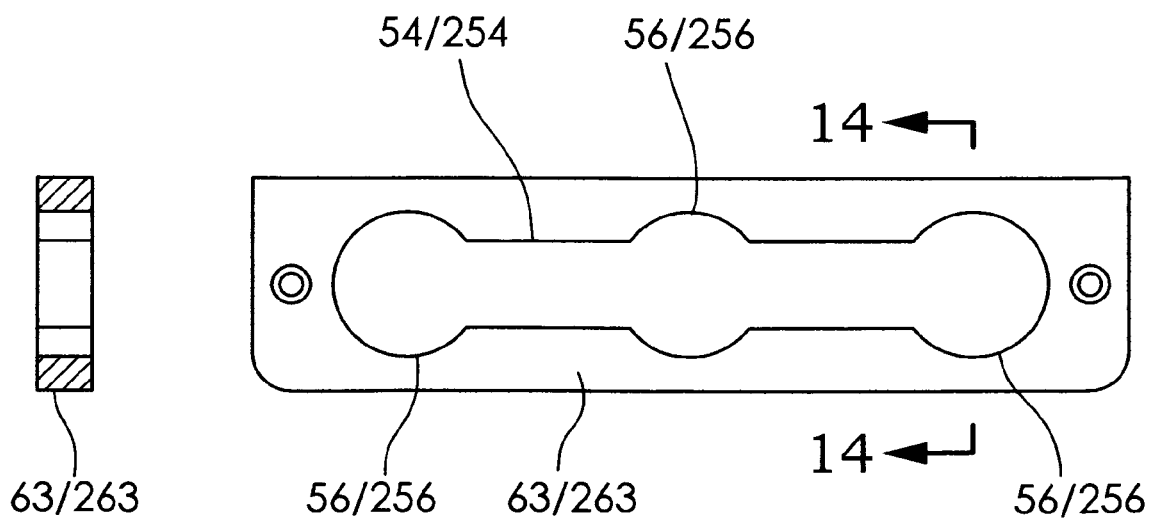
FIG. 13 is a right elevational view of the wear plate of FIG. 12.
FIG. 14 is a front sectional elevational view of the wear plate of FIG. 12, taken along lines 14-14 of FIG. 13, showing the detent bores.
Figures 15, 16:
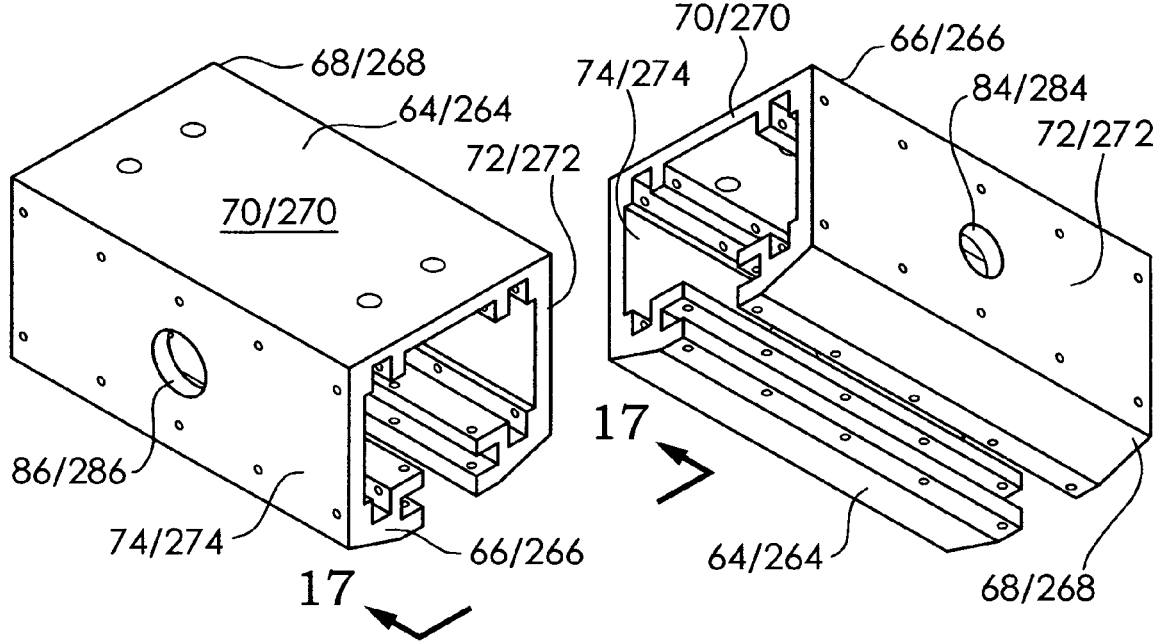
FIG. 15 is a top perspective view of the carriage of the roller mount for seats of FIG. 1.
FIG. 16 is a bottom perspective view of the carriage of the roller mount for seats of FIG. 1.
Figure 17:
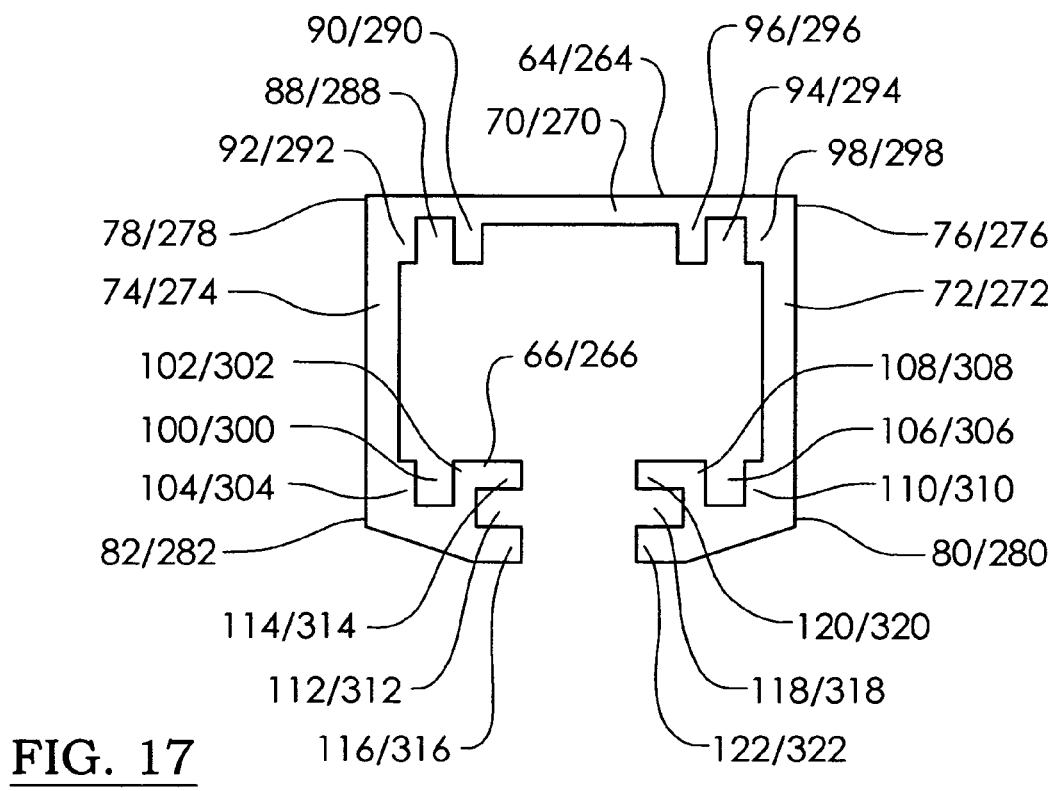
FIG. 17 is a front elevational view of the carriage FIG. 15, taken along lines 17-17 of FIG. 15.
Figure 18:
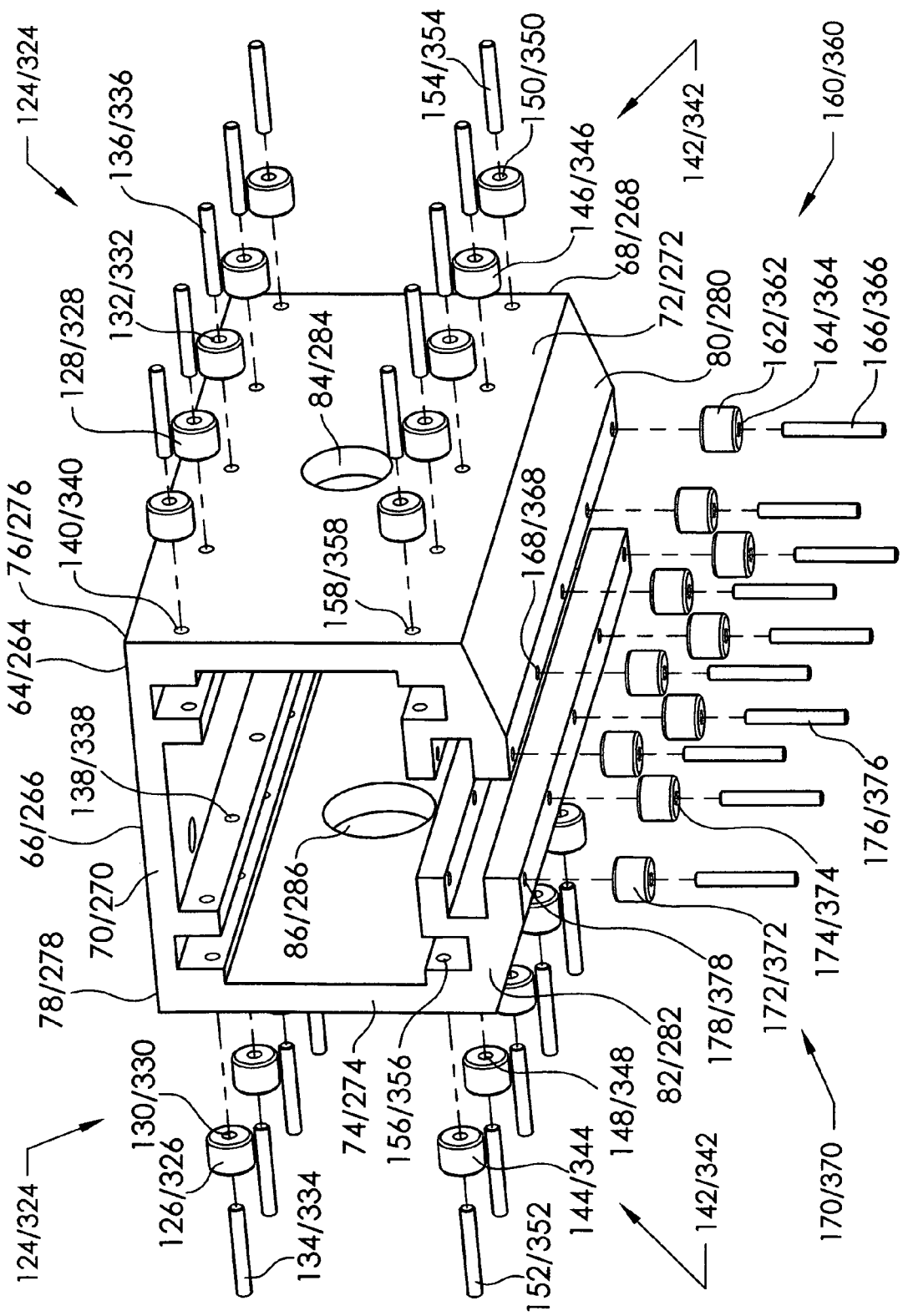
FIG. 18 is an exploded, perspective, assembly view of the carriage of the roller mount for seats of FIG. 1.
Figure 19:
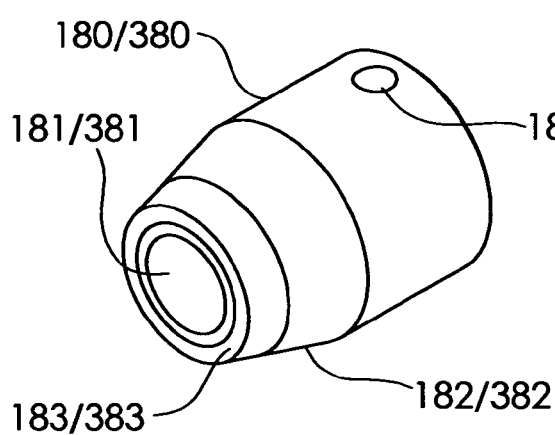
FIG. 19 is a perspective, assembly view of the sliding detent collar of the roller mount for seats of FIG. 1, showing the ring assembled.
Figure 20:
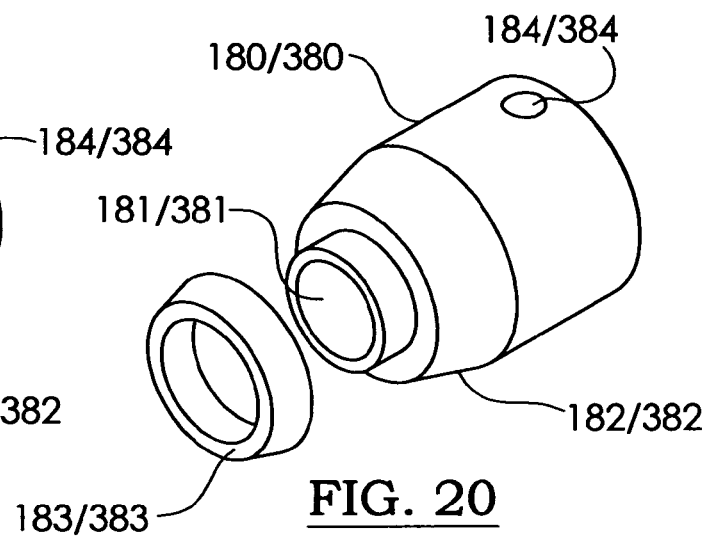
FIG. 20 is a perspective, assembly view of the sliding detent collar of FIG. 19, showing the ring exploded.
Figure 21:
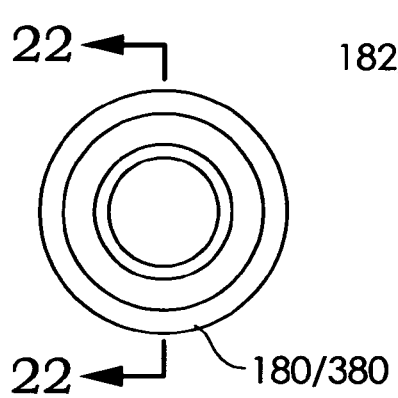
FIG. 21 is a front elevational view of the sliding detent collar of FIG. 19.
Figure 22:
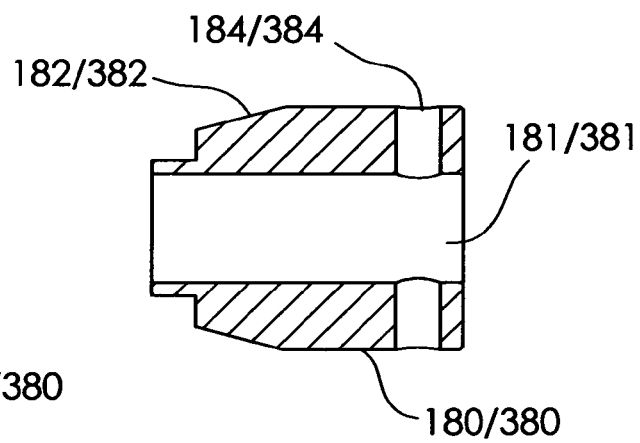
FIG. 22 is a right side elevational sectional view of the sliding detent collar of FIG. 19, taken along lines 22-22 of FIG. 21.
Figure 23:
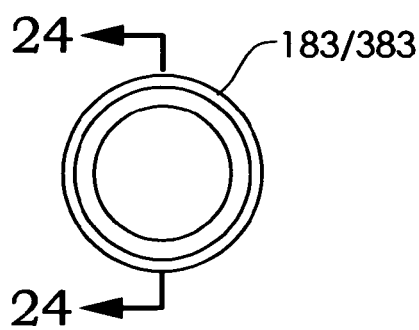
FIG. 23 is a front elevational view of the ring of the sliding detent collar of FIG. 19.
Figure 24:
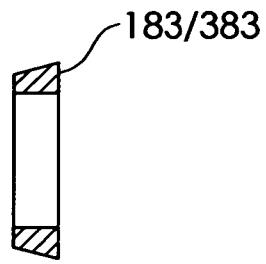
FIG. 24 is a right side elevational sectional view of the ring of FIG. 19, taken along lines 24-24 of FIG. 23.
Figure 25:
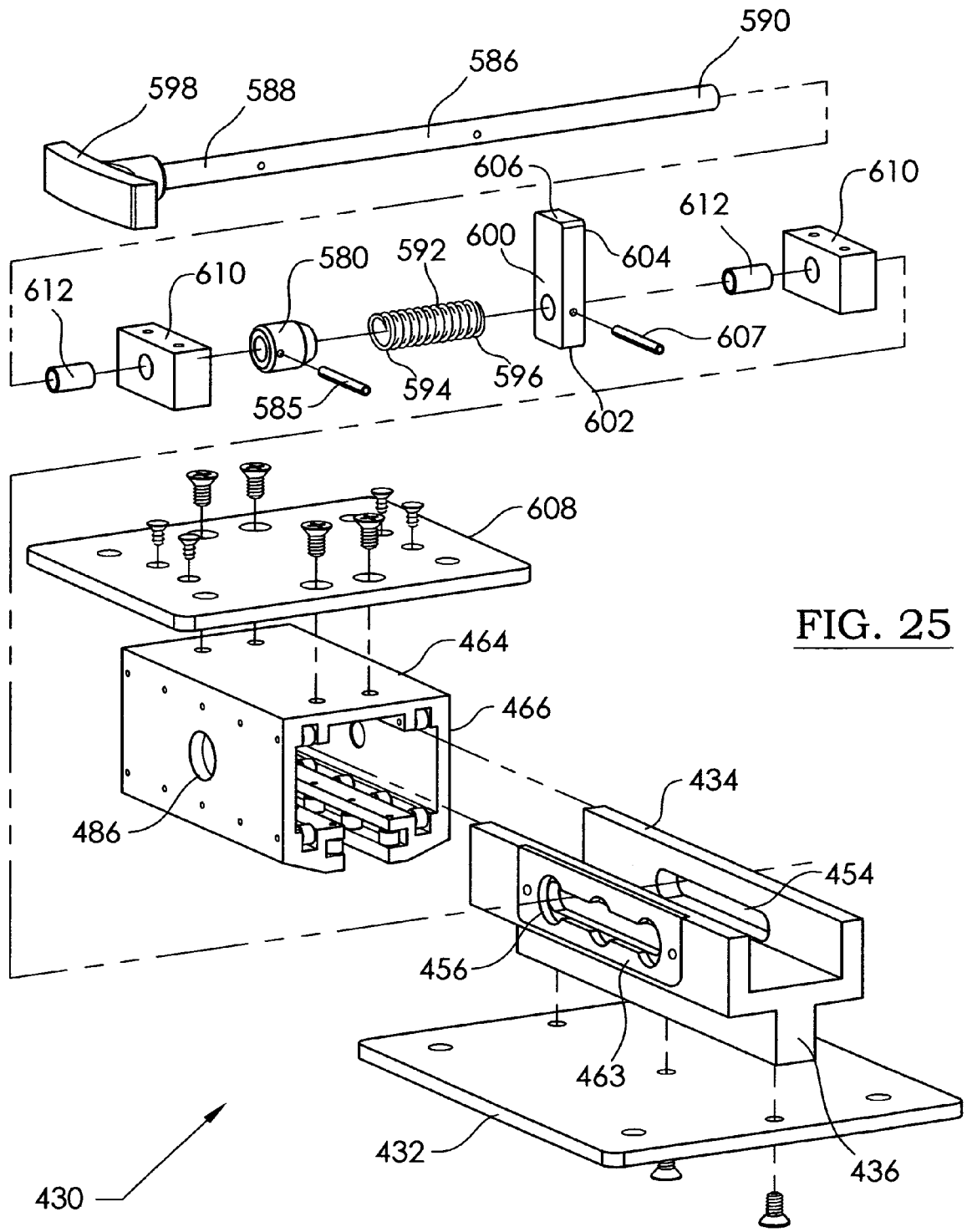
FIG. 25 is an exploded, perspective, assembly view of another roller mount for seats constructed in accordance with the invention.
Figure 26:
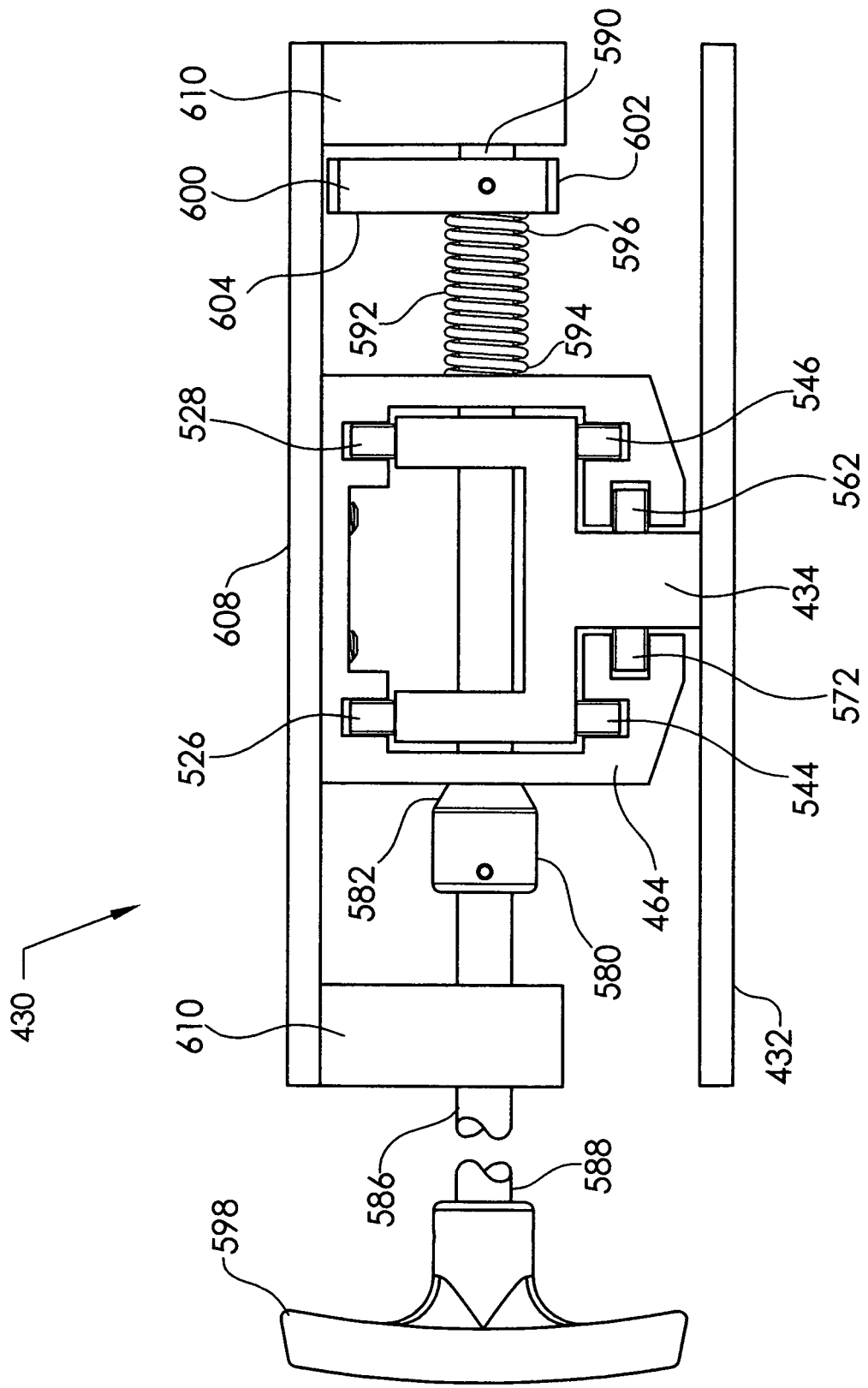
FIG. 26 is a front view of the roller mount for seats of FIG. 25.
Figure 34:
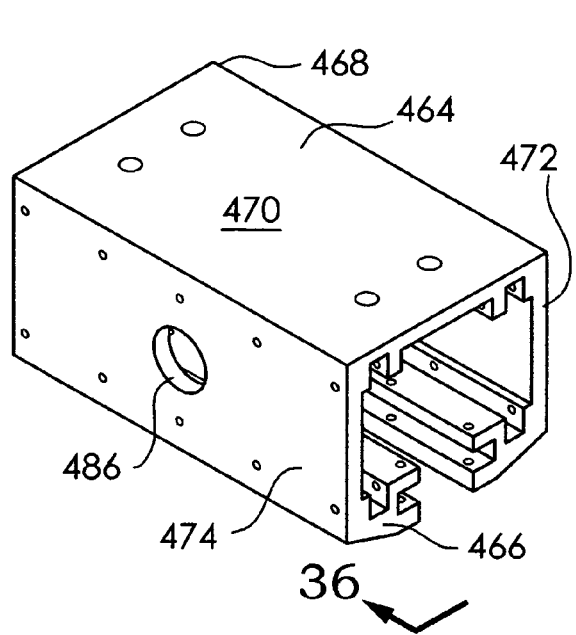
FIG. 34 is a top perspective view of the carriage of the roller mount for seats of FIG. 25.
Figure 35:
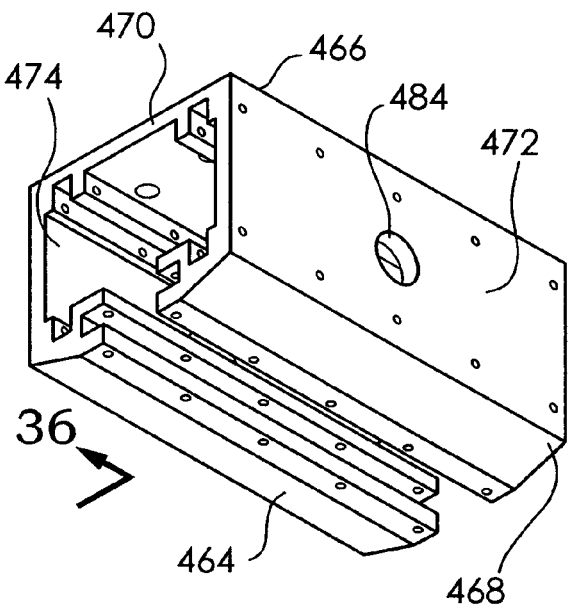
FIG. 35 is a bottom perspective view of the carriage of the roller mount for seats of FIG. 25.
Figure 36:
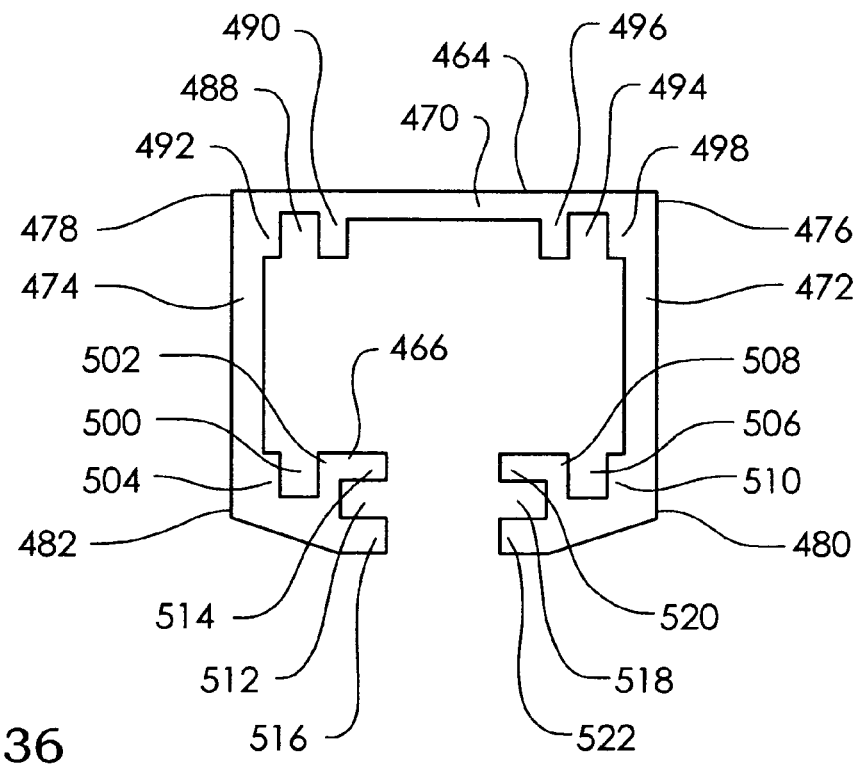
FIG. 36 is a front elevational view of the carriage FIG. 34, taken along lines 36-36 of FIG. 34.
Figure 37:
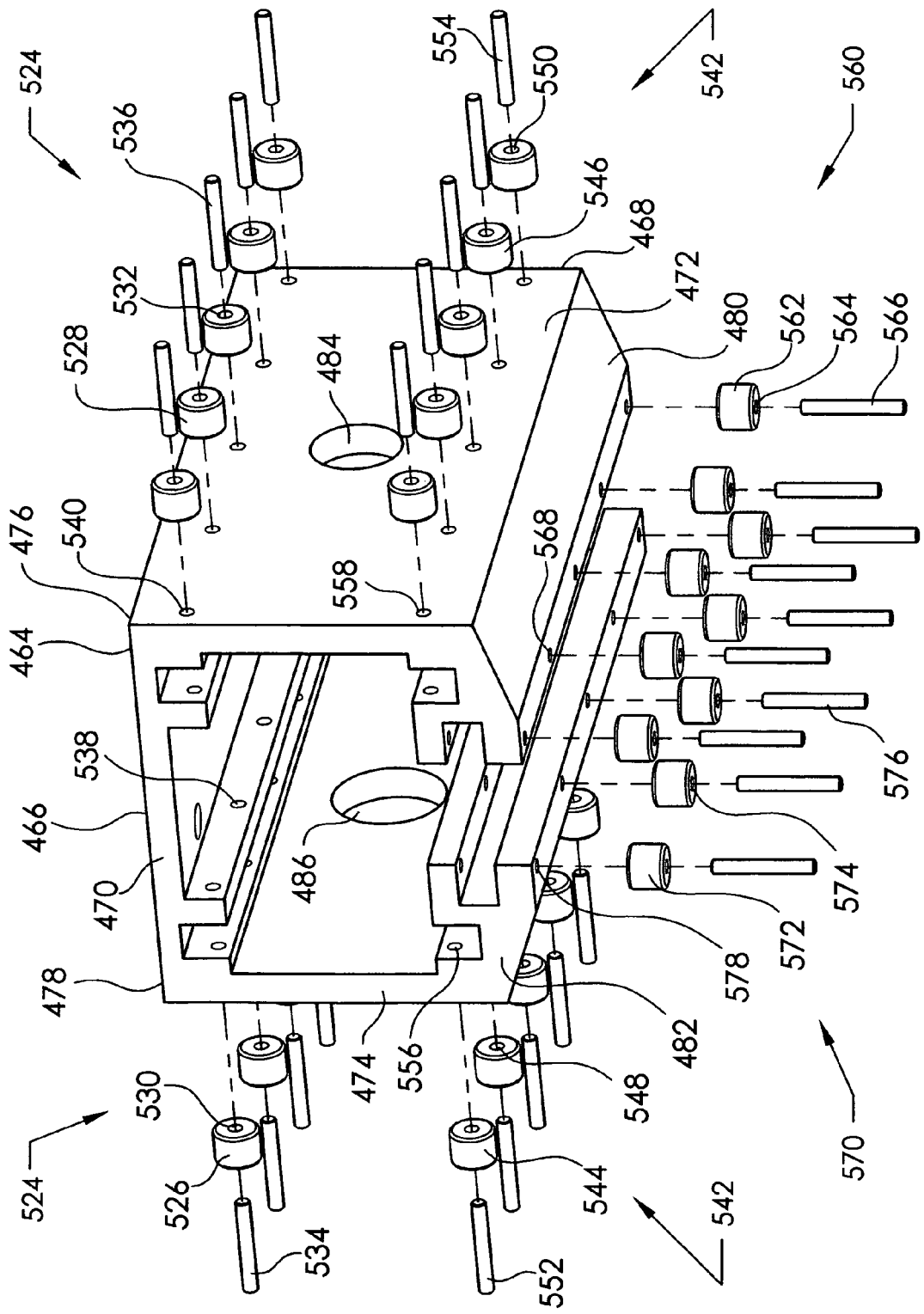
FIG. 37 is an exploded, perspective, assembly view of the carriage of the roller mount for seats of FIG. 25.
Figure 38:
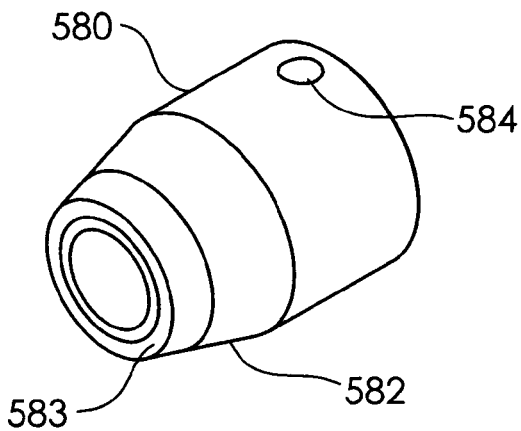
FIG. 38 is a perspective, assembly view of the detent collar of the roller mount for seats of FIG. 25, showing the ring assembled.
Figure 39:
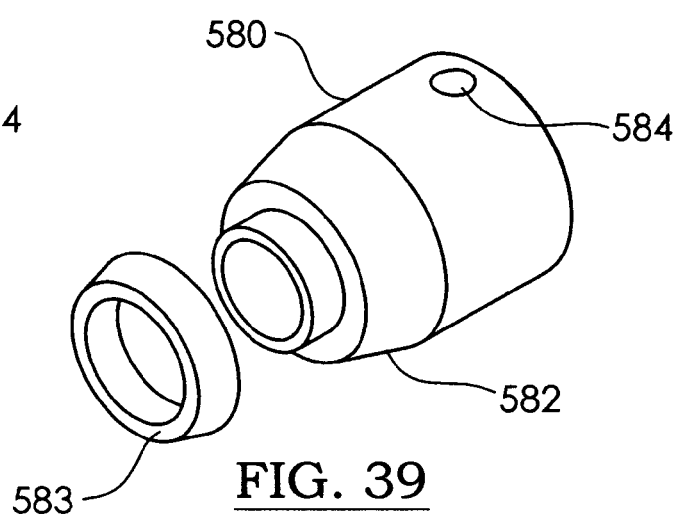
FIG. 39 is a perspective, assembly view of the detent collar of FIG. 38, showing the ring exploded.
Figure 40:
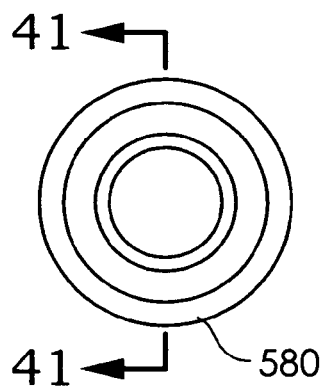
FIG. 40 is a front elevational view of the detent collar of FIG. 38.
Figure 41:
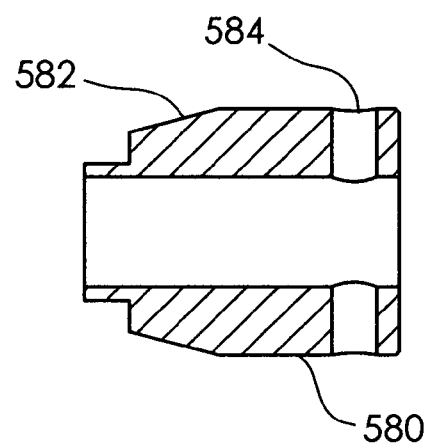
FIG. 41 is a right side elevational sectional view of the sliding detent collar of FIG. 38, taken along lines 41-41 of FIG. 40.
Figure 42:
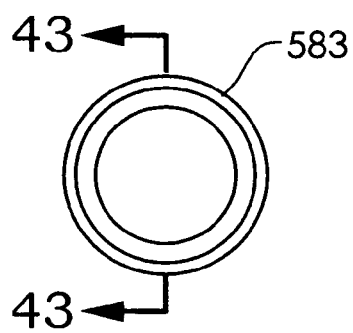
FIG. 42 is a front elevational view of the ring of the sliding detent collar of FIG. 38.
Figure 43:
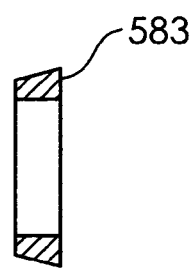
FIG. 43 is a right side elevational sectional view of the ring of FIG. 42, taken along lines 43-43 of FIG. 42.

The first 56 and second 256 track detent bores can assume a variety of configurations. As shown in FIGS. 12-14, a straight bore passes through the slot 54/254. The detent bores 56 and 256 can be tapered to match the detent collar taper. Any bore shape will work. However the straight bores are preferred, as there is less tendency for the seat to force the detent collar conical ends out of engagement with the detent bores.

Turning now to FIGS. 25-43, another roller mount for seats is shown at 430, and is for use in connection with a boat and a seat (not shown). The roller mount for seats 430 is similar to the roller mount for seats 30 described above in that it comprises a base plate 432 adapted for mounting in the boat. A track 434 is mounted on the base plate 432. The track 434 has a generally Y-shaped cross-section extending longitudinally between opposite front 436 and rear 438 ends. The track 434 has a transverse track web 440. The track Y-shaped cross-section has opposite left 442 and right 444 track flanges extending upward from the track web 440. The track flanges have a left 446 and right 448 upper edge and a left 450 and right 452 lower edge. The left 442 and right 444 track flanges each have a track slot 454 through each flange. The slots 454 extend longitudinally from adjacent the front end 436 to adjacent the rear end 438. Either one of the left 442 and right 444 track flanges has a plurality of track detent bores 456 in the track slot 454. In the embodiment shown, the track detent bores 456 are disposed in the right track flange 444. The track detent bores 456 have a predetermined diameter. The track 434 includes a wear plate 463 mounted into a recess 457 in one of the left 442 and right 444 track flanges. In the embodiment shown, the track detent bores 456 are disposed in the wear plate 463. The track 434 has a central track pillar 458. The track pillar 458 has a left side 460 and a right side 462.

A carriage 464 partially surrounds the track 434, and is mounted for longitudinal rolling movement on the track 434. The carriage 464 has a generally inverted U-shaped cross-section extending longitudinally between opposite front 466 and rear 468 ends. The carriage 464 has a transverse carriage web 470. The carriage U-shaped cross-section has opposite left 472 and right 474 carriage flanges extending downward from the transverse carriage web 470. The carriage flanges have a left 476 and right 478 upper edge and a left 480 and right 482 lower edge. The left 472 and right 474 carriage flanges have a left 484 and right 486 carriage detent hole respectively through the flanges. The carriage 464 has an upper right lateral channel 488 with an inner leg 490 and an outer leg 492, and an upper left lateral channel 494 with an inner leg 496 and an outer leg 498, the channels facing downward.

The carriage 464 has a lower right lateral channel 500 with an inner leg 502 and an outer leg 504, and a lower left lateral channel 506 with an inner leg 508 and an outer leg 510, the channels facing upward. The carriage 464 has a right medial channel 512 with an inner leg 514 and an outer leg 516, and a left medial channel 518 with an inner leg 520 and an outer leg 522, the channels facing inward. Each channel extends longitudinally between the carriage front 466 and rear 468 ends.

A plurality of upper rolling elements 524 are mounted on the carriage 464 for rolling engagement with the track 434. The upper rolling elements 524 are disposed bearing downward against the track left flange upper edge 446 and the track right flange upper edge 448, so as to resist downward forces against the track 434. The upper rolling elements 524 include upper right 526 and upper left 528 transverse rollers. The rollers 526 and 528 each have a horizontal axis of rotation and an upper right 530 and an upper left 532 hole through the axis respectively. The upper rolling elements 524 have an upper right 534 and an upper left 536 axle for each roller respectively. The inner and outer legs of the upper right lateral channel 488 and the upper left lateral channel 494 have collinear axle holes 538 and 540 respectively, which are perpendicular to the channels. The axles 534 and 536 are closely received in the axle holes 538 and 540 respectively, and are preferably a press fit. The rollers 526 and 528 are mounted for rotation on the axles 534 and 536 respectively. The rollers 526 and 528 are mounted between the inner leg and the outer leg of the upper right lateral channel 488 and the upper left lateral channel 494 respectively.

A plurality of lower rolling elements 542 are mounted on the carriage 464 for rolling engagement with the track 434. The lower rolling elements 542 are disposed bearing upward against the track left flange lower edge 450 and the track right flange lower edge 452, so as to resist upward forces against the track 434. The lower rolling elements 542 include lower right 544 and lower left 546 transverse rollers. The rollers 544 and 546 each have a horizontal axis of rotation and a lower right 548 and lower left 550 hole through the axis respectively. The lower rolling elements 542 have a lower right 552 and lower left 554 axle for each roller respectively. The inner and outer legs of the lower right lateral channel 500 and the lower left lateral channel 506 have collinear axle holes 556 and 558 respectively, which are perpendicular to the channels. The axles 552 and 554 are closely received in the axle holes 556 and 558 respectively, and are preferably a press fit. The rollers 544 and 546 are mounted for rotation on the axles 552 and 554 respectively. The rollers 544 and 546 are mounted between the inner leg and the outer leg of the lower right lateral channel 500 and the lower left lateral channel 506 respectively.

A plurality of left rolling elements 560 are mounted on the carriage 464 for rolling engagement with the track 434. The left rolling elements 560 are disposed bearing rightward against the track pillar left side 460, so as to resist rightward forces against the track 434. The left rolling elements 560 include left vertical rollers 562. The rollers 562 each have a vertical axis of rotation and a hole 564 through the axis. The left rolling elements 562 have an axle 566 for each roller 562. The inner leg and the outer leg of each left medial channel 518 have collinear axle holes 568, which are perpendicular to the channels. The axles 566 are closely received in the axle holes 568, and are preferably a press fit. The left vertical rollers 562 are mounted for rotation on the axles 566. The left vertical rollers 562 are mounted between the inner leg and the outer leg of each left medial channel 518.

A plurality of right rolling elements 570 are mounted on the carriage 464 for rolling engagement with the track 434. The right rolling elements 570 are disposed bearing leftward against the track pillar right side 462, so as to resist leftward forces against the track 434. The right rolling elements 570 include right vertical rollers 572. The rollers 572 each have a vertical axis of rotation and a hole 574 through the axis. The right rolling elements 570 have an axle 576 for each roller 572. The inner leg and the outer leg of each right medial channel 512 have collinear axle holes 578, which are perpendicular to the channels. The axles 576 are closely received in the axle holes 578, and are preferably a press fit. The right vertical rollers 572 are mounted for rotation on the axles 576. The right vertical rollers 572 are mounted between the inner leg and the outer leg of each right medial channel 512.

A top plate 608 is mounted on the carriage. The top plate 608 is adapted to support the seat.

A detent is provided for locking the seat in the selected position. The detent has a detent collar 580 disposed for sliding movement in the carriage right detent hole 486. The detent collar 580 is adapted for selective releasable engagement with any one of the track detent bores 456. The detent collar 580 is a cylinder with a diameter greater than that of the track detent bores 456. The detent collar 580 has a conical end 582 tapering to a frustrum of a cone for selective engagement with any one of the track detent bores 456. An optional ring 583 is pressed onto the conical end 582 of the collar 580. The ring 583 is made of a polymer and serves to grip the track detent bore 456 to minimize slippage. The detent has a shaft 586 extending between opposite right 588 and left 590 ends. The detent collar 580 has a hole 584 extending transversely through the detent collar 580. The hole 584 engages a transverse fastener 585, preferably a roll pin, for mounting the detent collar 580 in a fixed position on the shaft 586.

The detent has a spring 592 to bias the detent collar conical end 582 releasably into engagement with one of the track detent bores 456. The spring 592 extends between opposite right 594 and left 596 ends. A stop block 600 is a mounted on the shaft left end 590. The stop block 600 extends from a proximal end 602 upward to a distal end 604. The distal end 604 has a flat 606 juxtaposed with the top plate 608 to preclude the shaft 586 from rotating. The left end 596 of the spring 592 bears against the stop block 600. The right end 594 of the spring 592 bears against the carriage 464. The detent has a handle 598 mounted on the right end 588 of the shaft 586. A plurality of shaft supports 610 with shaft support bushings 612 are disposed along the shaft 586 and are fastened to the top plate 608.

The roller mount for seats 430 differs from the roller mount for seats 30 described above in that it has only one track 434, one carriage 464, and one detent collar 580. The roller mount for seats 430 is intended to mount a seat for a single occupant, such as a bucket seat. The assembly is therefore correspondingly narrow.

The preferred materials for both embodiments is marine grade aluminum for the base and top plates, the tracks, carriages, stop block, support blocks, and detent collars. The rollers, rings and bushings are a polymeric resin, preferably an acetal such as Delrin®. The shaft, wear plates, spring, axles, and fasteners are stainless steel.

It is to be understood that many elements can be reversed right to left without losing any functionality, and that the resulting embodiments of the invention will still fall within the scope of the claims. Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications that will come within the scope of the appended claims is reserved.

PARTS LIST
ROLLER MOUNT FOR SEATS

| PART NO. | DESCRIPTION |
|---|---|
| 30 | roller mount for seats |
| 32 | base plate |
| 34 | first track |
| 36 | first track front end |
| 38 | first track rear end |
| 40 | first track web |
| 42 | first track left flange |
| 44 | first track right flange |
| 46 | first track left flange upper edge |
| 48 | first track right flange upper edge |
| 50 | first track left flange lower edge |
| 52 | first track right flange lower edge |
| 54 | first track slot |
| 56 | first track detent bores |
| 57 | first track recess |
| 58 | first track central pillar |
| 60 | first track central pillar left side |
| 62 | first track central pillar right side |
| 63 | first track wear plate |
| 64 | first carriage |
| 66 | first carriage front end |
| 68 | first carriage rear end |
| 70 | first carriage transverse web |
| 72 | first carriage left flange |
| 74 | first carriage right flange |
| 76 | first carriage left flange upper edge |
| 78 | first carriage rt. flange upper edge |
| 80 | first carriage left flange lower edge |
| 82 | first carriage rt. flange lower edge |
| 84 | first carriage left detent hole |
| 86 | first carriage right detent hole |
| 88 | upper right lateral channel |
| 90 | upper rt. lateral channel inner leg |
| 92 | upper rt. lateral channel outer leg |
| 94 | upper left lateral channel |
| 96 | upper left lateral channel inner leg |
| 98 | upper left lateral channel outer leg |
| 100 | lower right lateral channel |
| 102 | lower rt. lateral channel inner leg |
| 104 | lower rt. lateral channel outer leg |
| 106 | lower left lateral channel |
| 108 | lower left lateral channel inner leg |
| 110 | lower left lateral channel outer leg |
| 112 | right medial channel |
| 114 | right medial channel inner leg |
| 116 | right medial channel outer leg |
| 118 | left medial channel |
| 120 | left medial channel inner leg |
| 122 | left medial channel outer leg |
| 124 | upper rolling elements |
| 126 | upper right transverse roller |
| 128 | upper left transverse roller |
| 130 | upper right transverse roller hole |
| 132 | upper left transverse roller hole |
| 134 | upper right transverse roller axle |
| 136 | upper left transverse roller axle |
| 138 | upper rt. lateral channel axle holes |
| 140 | upper left lateral channel axle holes |
| 142 | lower rolling elements |
| 144 | lower right transverse roller |
| 146 | lower left transverse roller |
| 148 | lower right transverse roller hole |
| 150 | lower left transverse roller hole |
| 152 | lower right transverse roller axle |
| 154 | lower left transverse roller axle |
| 156 | lower rt. lateral channel axle hole |
| 158 | lower left lateral channel axle hole |
| 160 | left rolling elements |
| 162 | left vertical roller |
| 164 | left vertical roller hole |
| 166 | left vertical roller axle |
| 168 | left medial channel axle holes |
| 170 | right rolling elements |
| 172 | right vertical roller |
| 174 | right vertical roller hole |
| 176 | right vertical roller axle |
| 178 | right medial channel axle holes |
| 180 | first detent collar |
| 181 | first longitudinal hole |
| 182 | first detent collar conical end |
| 183 | ring |
| 184 | first detent collar hole |
| 185 | first transverse fastener |
| 186 | shaft |
| 188 | shaft right end |
| 190 | shaft left end |
| 192 | shaft support |
| 194 | shaft support bushing |
| 198 | handle |
| 234 | second track |
| 236 | second track front end |
| 238 | second track rear end |
| 240 | second track web |
| 242 | second track left flange |
| 244 | second track right flange |
| 246 | second track flange left upper edge |
| 248 | second track flange rt. upper edge |
| 250 | second track flange left lower edge |
| 252 | second track flange rt. lower edge |
| 254 | second track slot |
| 256 | second track detent bores |
| 257 | second track recess |
| 258 | second track central pillar |
| 260 | second track central pillar left side |
| 262 | second track central pillar rt. side |
| 263 | second track wear plate |
| 264 | second carriage |
| 266 | second carriage front end |
| 268 | second carriage rear end |
| 270 | second carriage transverse web |
| 272 | second carriage left flange |
| 274 | second carriage right flange |
| 276 | second carriage left flange upper edge |
| 278 | second carriage rt. flange upper edge |
| 280 | second carriage left flange lower edge |
| 282 | second carriage rt. flange lower edge |
| 284 | second carriage left detent hole |
| 286 | second carriage right detent hole |
| 288 | upper right lateral channel |
| 290 | upper rt. lateral channel inner leg |
| 292 | upper rt. lateral channel outer leg |
| 294 | upper left lateral channel |
| 296 | upper left lateral channel inner leg |
| 298 | upper left lateral channel outer leg |
| 300 | lower right lateral channel |
| 302 | lower rt. lateral channel inner leg |
| 304 | lower rt. lateral channel outer leg |
| 306 | lower left lateral channel |
| 308 | lower left lateral channel inner leg |
| 310 | lower left lateral channel outer leg |
| 312 | right medial channel |
| 314 | right medial channel inner leg |
| 316 | right medial channel outer leg |
| 318 | left medial channel |
| 320 | left medial channel inner leg |
| 322 | left medial channel outer leg |
| 324 | upper rolling elements |
| 326 | upper right transverse roller |
| 328 | upper left transverse roller |
| 330 | upper right transverse roller hole |
| 332 | upper left transverse roller hole |
| 334 | upper right transverse roller axle |
| 336 | upper left transverse roller axle |
| 338 | upper rt. lateral channel axle holes |
| 340 | upper left lateral channel axle holes |
| 342 | lower rolling elements |
| 344 | lower right transverse roller |
| 346 | lower left transverse roller |
| 348 | lower right transverse roller hole |
| 350 | lower left transverse roller hole |

| PARTS LIST ROLLER MOUNT FOR SEATS | |
|---|---|
| PART NO. | DESCRIPTION |
| 352 | lower right transverse roller axle |
| 354 | lower left transverse roller axle |
| 356 | lower rt. lateral channel axle hole |
| 358 | lower left lateral channel axle hole |
| 360 | left rolling elements |
| 362 | left vertical roller |
| 364 | left vertical roller hole |
| 366 | left vertical roller axle |
| 368 | left medial channel axle holes |
| 370 | right rolling elements |
| 372 | right vertical roller |
| 374 | right vertical roller hole |
| 376 | right vertical roller axle |
| 378 | right medial channel axle holes |
| 380 | second detent collar |
| 381 | second longitudinal hole |
| 382 | second detent collar conical end |
| 383 | ring |
| 384 | second detent collar hole |
| 385 | second transverse fastener |
| 386 | stop block |
| 387 | stop block proximal end |
| 388 | stop block distal end |
| 389 | stop block flat |
| 390 | stop block fastener |
| 392 | spring |
| 394 | spring right end |
| 396 | spring left end |
| 398 | top plate |
| 400 | arrow out |
| 402 | arrow in |
| 430 | roller mount for seats |
| 432 | base plate |
| 434 | track |
| 436 | track front end |
| 438 | track rear end |
| 440 | track web |
| 442 | track left flange |
| 444 | track right flange |
| 446 | track left flange upper edge |
| 448 | track right flange upper edge |
| 450 | track left flange lower edge |
| 452 | track right flange lower edge |
| 454 | track slot |
| 456 | track detent bores |
| 457 | track recess |
| 458 | track central pillar |
| 460 | track central pillar left side |
| 462 | track central pillar right side |
| 463 | track wear plate |
| 464 | carriage |
| 466 | carriage front end |
| 468 | carriage rear end |
| 470 | carriage transverse web |
| 472 | carriage left flange |
| 474 | carriage right flange |
| 476 | carriage left flange upper edge |
| 478 | carriage rt. flange upper edge |
| 480 | carriage left flange lower edge |
| 482 | carriage rt. flange lower edge |
| 484 | carriage left detent hole |
| 486 | carriage right detent hole |
| 488 | upper right lateral channel |
| 490 | upper rt. lateral channel inner leg |
| 492 | upper rt. lateral channel outer leg |
| 494 | upper left lateral channel |
| 496 | upper left lateral channel inner leg |
| 498 | upper left lateral channel outer leg |
| 500 | lower right lateral channel |
| 502 | lower rt. lateral channel inner leg |
| 504 | lower rt. lateral channel outer leg |
| 506 | lower left lateral channel |
| 508 | lower left lateral channel inner leg |
| 510 | lower left lateral channel outer leg |
| 512 | right medial channel |

| PARTS LIST ROLLER MOUNT FOR SEATS | |
|---|---|
| PART NO. | DESCRIPTION |
| 514 | right medial channel inner leg |
| 516 | right medial channel outer leg |
| 518 | left medial channel |
| 520 | left medial channel inner leg |
| 522 | left medial channel outer leg |
| 524 | upper rolling elements |
| 526 | upper right transverse roller |
| 528 | upper left transverse roller |
| 530 | upper right transverse roller hole |
| 532 | upper left transverse roller hole |
| 534 | upper right transverse roller axle |
| 536 | upper left transverse roller axle |
| 538 | upper rt. lateral channel axle holes |
| 540 | upper left lateral channel axle holes |
| 542 | lower rolling elements |
| 544 | lower right transverse roller |
| 546 | lower left transverse roller |
| 548 | lower right transverse roller hole |
| 550 | lower left transverse roller hole |
| 552 | lower right transverse roller axle |
| 554 | lower left transverse roller axle |
| 556 | lower rt. lateral channel axle hole |
| 558 | lower left lateral channel axle hole |
| 560 | left rolling elements |
| 562 | left vertical roller |
| 564 | left vertical roller hole |
| 566 | left vertical roller axle |
| 568 | left medial channel axle holes |
| 570 | right rolling elements |
| 572 | right vertical roller |
| 574 | right vertical roller hole |
| 576 | right vertical roller axle |
| 578 | right medial channel axle holes |
| 580 | detent collar |
| 582 | detent collar conical end |
| 583 | ring |
| 584 | detent collar hole |
| 585 | transverse fastener |
| 586 | shaft |
| 588 | shaft right end |
| 590 | shaft left end |
| 592 | spring |
| 594 | spring right end |
| 596 | spring left end |
| 598 | handle |
| 600 | stop block |
| 602 | stop block proximal end |
| 604 | stop block distal end |
| 606 | stop block flat |
| 607 | stop block fastener |
| 608 | top plate |
| 610 | shaft support |
| 612 | shaft support bushing |

The embodiments of the invention in which an exclusive property or privilege is claimed are defined as follows:

1. A roller mount for seats for use in connection with a boat and a seat, the roller mount for seats comprising:
   a base plate, the base plate being adapted for mounting in the boat;
   at least one first track mounted on the base plate, the first track having a generally Y-shaped cross-section extending longitudinally between opposite front and rear ends, the first track having a transverse track web, the first track Y-shaped cross-section having opposite left and right track flanges extending upward from the track web, the first track having a central track pillar;
   at least one first carriage adapted for engagement with the first track, the first carriage having a generally inverted U-shaped cross-section extending longitudinally between opposite front and rear ends, the first carriage having a transverse carriage web, the first carriage U-shaped cross-section having opposite left and right carriage flanges extending downward from the transverse carriage web;

a plurality of upper rolling elements mounted on the first carriage for rolling engagement with the first track, the upper rolling elements being disposed bearing downward against the first track, so as to resist downward forces against the first track;

a plurality of lower rolling elements mounted on the first carriage for rolling engagement with the first track, the lower rolling elements being disposed bearing upward against the first track, so as to resist upward forces against the first track;

a plurality of left rolling elements mounted on the first carriage for rolling engagement with the first track, the left rolling elements being disposed bearing rightward against the first track, so as to resist rightward forces against the first track;

a plurality of right rolling elements mounted on the first carriage for rolling engagement with the first track, the right rolling elements being disposed bearing leftward against the first track, so as to resist leftward forces against the first track;

a top plate mounted on the first carriage, the top plate being adapted to support the seat; and detent means for releasably locking the first carriage with respect to the first track, so as to preclude the first carriage from rolling along the first track.

2. The roller mount for seats of claim 1, wherein the detent means further comprises:

at least one of the left and right first carriage flanges having a carriage detent hole therethrough;

one of the left and right first track flanges having a plurality of first track detent bores, the first track detent bores having a predetermined diameter; and at least one first detent collar mounted for sliding movement in the first carriage detent hole, the first detent collar being adapted for selective releasable engagement with one of the first track detent bores, so as to preclude movement of the first carriage with respect to the first track when the first detent collar is engaged, and to allow movement of the first carriage with respect to the first track when the first detent collar is disengaged.

3. The roller mount for seats of claim 1, further comprising:

a second track mounted on the base plate parallel to the first track and spaced apart from the first track, the second track having a generally Y-shaped cross-section extending longitudinally between opposite front and rear ends, the second track having a transverse track web, the second track Y-shaped cross-section having opposite left and right track flanges extending upward from the track web, the left and right track flanges each having an upper edge and a lower edge, the second track having a central track pillar, the track pillar having a left side and a right side;

a second carriage adapted for engagement with the second track, the second carriage having a generally inverted U-shaped cross-section extending longitudinally between opposite front and rear ends, the second carriage having a transverse carriage web, the second carriage U-shaped cross-section having opposite left and right carriage flanges extending downward from the transverse carriage web, the left and right carriage flanges each having an upper edge and a lower edge, the top plate being mounted on the second carriage;

a plurality of upper rolling elements mounted on the second carriage for rolling engagement with the second track, the upper rolling elements being disposed bearing downward against the second track, so as to resist downward forces against the second track;

a plurality of lower rolling elements mounted on the second carriage for rolling engagement with the second track, the lower rolling elements being disposed bearing upward against the second track, so as to resist upward forces against the second track;

a plurality of left rolling elements mounted on the second carriage for rolling engagement with the second track, the left rolling elements being disposed bearing rightward against the second track, so as to resist rightward forces against the second track;

a plurality of right rolling elements mounted on the second carriage for rolling engagement with the second track, the right rolling elements being disposed bearing leftward against the second track, so as to resist leftward forces against the second track; and the detent means releasably locking the second carriage with respect to the second track, so as to preclude the second carriage from rolling along the second track.

4. The roller mount for seats of claim 3, further comprising:

the first carriage and the second carriage each having an upper right and an upper left lateral channel facing downward, a lower right and a lower left lateral channel facing upward, and a right and a left medial channel facing inward, each channel having an inner leg and an outer leg, each channel extending longitudinally between the carriage front and rear ends;

the upper rolling elements including upper right and upper left transverse rollers, the rollers each having a horizontal axis of rotation and a hole through the axis, the upper rolling elements having an axle for each roller, the inner leg and the outer leg of each upper lateral channel having collinear axle holes perpendicular to the channels, the axles being closely received in the axle holes, the rollers being mounted for rotation on the axles and between the inner leg and the outer leg of each upper lateral channel;

the lower rolling elements including lower right and lower left transverse rollers, the rollers each having a horizontal axis of rotation and a hole through the axis, the lower rolling elements having an axle for each roller, the inner leg and the outer leg of each lower lateral channel having collinear axle holes perpendicular to the channels, the axles being closely received in the axle holes, the rollers being mounted for rotation on the axles and between the inner leg and the outer leg of each lower lateral channel;

the left rolling elements including left vertical rollers, the rollers each having a vertical axis of rotation and a hole through the axis, the left rolling elements having an axle for each roller, the inner leg and the outer leg of each left medial channel having collinear axle holes perpendicular to the channels, the axles being closely received in the axle holes, the rollers being mounted for rotation on the axles and between the inner leg and the outer leg of each left medial channel; and the right rolling elements including right vertical rollers, the rollers each having a vertical axis of rotation and a hole through the axis, the right rolling elements having an axle for each roller, the inner leg and the outer leg of each right medial channel having collinear axle holes perpendicular to the channels, the axles being closely received in the axle holes, the rollers being mounted for rotation on the axles and between the inner leg and the outer leg of each right medial channel.

5. The roller mount for seats of claim 4, wherein the detent means further comprises:
- a one of the left and right first track flanges having a plurality of first track detent bores, the first track detent bores having a predetermined diameter;
- the left and right second track flanges each having a track slot therethrough extending longitudinally from adjacent the front end to adjacent the rear end, one of the left and right track flanges having a plurality of second track detent bores in the track slot, the second track detent bores having the same diameter as the first track detent bores;
- at least one of the left and right first carriage flanges having a carriage detent hole therethrough;
- the left and right second carriage flanges each having a carriage detent hole therethrough;
- a first detent collar mounted for sliding movement in the first carriage detent hole, the first detent collar being adapted for selective releasable engagement with one of the first track detent bores, so as to preclude movement of the first carriage with respect to the first track when the first detent collar is engaged, and to allow movement of the first carriage with respect to the first track when the first detent collar is disengaged; and
- a second detent collar mounted for sliding movement in the second carriage detent hole, the second detent collar being adapted for selective releasable engagement with one of the second track detent bores, so as to preclude movement of the second carriage with respect to the second track when the second detent collar is engaged, and to allow movement of the second carriage with respect to the second track when the second detent collar is disengaged, the first and second detent collars being connected together, so as to engage and disengage substantially simultaneously.

6. The roller mount for seats of claim 5, wherein the detent means further comprises:
- a shaft extending through the second carriage detent holes, through the second track slots, and to the first carriage detent hole;
- the first and second detent collars each having a longitudinal hole therethrough for close collinear engagement with the shaft, the second detent collar being mounted in a fixed position on the shaft, the first detent collar being mounted in a fixed position on the shaft; and
- a spring adapted to bias the first detent collar into engagement with one of the first track detent bores, and the second detent collar into engagement with one of the second track detent bores.

7. The roller mount for seats of claim 6, wherein the detent means further comprises:
- a handle mounted on an end of the shaft, the handle being adapted for manual grasping;
- the first track left and right track flanges each having a track slot therethrough extending longitudinally from adjacent the front end to adjacent the rear end, one of the left and right track flanges having the first track detent bores in the track slot;
- the first carriage left and right carriage flanges each having a carriage detent hole therethrough;
- a stop block having a proximal end mounted on the shaft, and extending upward to a distal end, the distal end having a flat juxtaposed with the top plate to preclude the shaft from rotating; and
- the spring having one end bearing against the stop block, the spring having an opposite end bearing against the second carriage.

8. The roller mount for seats of claim 7, wherein the detent means further comprises:
- the first detent collar being a cylinder with a diameter greater than that of the first track detent bores, the first detent collar having one end tapering to a frustrum of a cone for engagement with one of the first track detent bores; and
- the second detent collar being a cylinder with a diameter greater than that of the second track detent bores, the second detent collar having one end tapering to a frustrum of a cone for engagement with one of the second track detent bores.

9. A roller mount for seats for use in connection with a boat and a seat, the roller mount for seats comprising:
- a base plate, the base plate being adapted for mounting in the boat;
- at least one first track mounted on the base plate, the first track having a generally Y-shaped cross-section extending longitudinally between opposite front and rear ends, the first track having a transverse track web, the first track Y-shaped cross-section having opposite left and right track flanges extending upward from the track web, the left and right track flanges each having an upper edge and a lower edge, a one of the left and right track flanges having a plurality of first track detent bores, the first track detent bores having a predetermined diameter, the first track having a central track pillar, the track pillar having a left side and a right side;
- at least one first carriage adapted for engagement with the first track, the first carriage having a generally inverted U-shaped cross-section extending longitudinally between opposite front and rear ends, the first carriage having a transverse carriage web, the first carriage U-shaped cross-section having opposite left and right carriage flanges extending downward from the transverse carriage web, the left and right carriage flanges each having an upper edge and a lower edge, at least one of the left and right carriage flanges having a carriage detent hole therethrough;
- a plurality of upper rolling elements mounted on the first carriage for rolling engagement with the first track, the upper rolling elements being disposed bearing downward against the first track, so as to resist downward forces against the first track;
- a plurality of lower rolling elements mounted on the first carriage for rolling engagement with the first track, the lower rolling elements being disposed bearing upward against the first track, so as to resist upward forces against the first track;
- a plurality of left rolling elements mounted on the first carriage for rolling engagement with the first track, the left rolling elements being disposed bearing rightward against the first track, so as to resist rightward forces against the first track;
- a plurality of right rolling elements mounted on the first carriage for rolling engagement with the first track, the right rolling elements being disposed bearing leftward against the first track, so as to resist leftward forces against the first track;
- a top plate mounted on the first carriage, the top plate being adapted to support the seat; and
- a detent, the detent having at least one first detent collar mounted for sliding movement in the first carriage detent hole, the first detent collar selectively and releasably engaging one of the first track detent bores, so as to preclude movement of the first carriage with respect to the first track when the first detent collar is engaged, and to allow movement of the first carriage with respect to the first track when the first detent collar is disengaged.

10. The roller mount for seats of claim 9, further comprising:
a second track mounted on the base plate parallel to the first track and spaced apart from the first track, the second track having a generally Y-shaped cross-section extending longitudinally between opposite front and rear ends, the second track having a transverse track web, the second track Y-shaped cross-section having opposite left and right track flanges extending upward from the track web, the left and right track flanges each having an upper edge and a lower edge, the left and right track flanges each having a track slot therethrough extending longitudinally from adjacent the front end to adjacent the rear end, one of the left and right track flanges having a plurality of second track detent bores in the track slot, the second track detent bores having the same diameter as the first track detent bores, the second track having a central track pillar, the track pillar having a left side and a right side;
a second carriage adapted for engagement with the second track, the second carriage having a generally inverted U-shaped cross-section extending longitudinally between opposite front and rear ends, the second carriage having a transverse carriage web, the second carriage U-shaped cross-section having opposite left and right carriage flanges extending downward from the transverse carriage web, the left and right carriage flanges each having an upper edge and a lower edge, the left and right carriage flanges each having a carriage detent hole therethrough, the top plate being mounted on the second carriage;
a plurality of upper rolling elements mounted on the second carriage for rolling engagement with the second track, the upper rolling elements being disposed bearing downward against the second track, so as to resist downward forces against the second track;
a plurality of lower rolling elements mounted on the second carriage for rolling engagement with the second track, the lower rolling elements being disposed bearing upward against the second track, so as to resist upward forces against the second track;
a plurality of left rolling elements mounted on the second carriage for rolling engagement with the second track, the left rolling elements being disposed bearing rightward against the second track, so as to resist rightward forces against the second track;
a plurality of right rolling elements mounted on the second carriage for rolling engagement with the second track, the right rolling elements being disposed bearing leftward against the second track, so as to resist leftward forces against the second track; and
the detent having a second detent collar mounted for sliding movement in the second carriage detent hole, the second detent collar selectively and releasably engaging one of the second track detent bores, so as to preclude movement of the second carriage with respect to the second track when the second detent collar is engaged, and to allow movement of the second carriage with respect to the second track when the second detent collar is disengaged, the first and second detent collars being connected together, so as to engage and disengage substantially simultaneously.

11. The roller mount for seats of claim 10, further comprising:
the first carriage and the second carriage each having an upper right and an upper left lateral channel facing downward, a lower right and a lower left lateral channel facing upward, and a right and a left medial channel facing inward, each channel having an inner leg and an outer leg, each channel extending longitudinally between the carriage front and rear ends;
the upper rolling elements including upper right and upper left transverse rollers, the rollers each having a horizontal axis of rotation and a hole through the axis, the upper rolling elements having an axle for each roller, the inner leg and the outer leg of each upper lateral channel having collinear axle holes perpendicular to the channels, the axles being closely received in the axle holes, the rollers being mounted for rotation on the axles and between the inner leg and the outer leg of each upper lateral channel;
the lower rolling elements including lower right and lower left transverse rollers, the rollers each having a horizontal axis of rotation and a hole through the axis, the lower rolling elements having an axle for each roller, the inner leg and the outer leg of each lower lateral channel having collinear axle holes perpendicular to the channels, the axles being closely received in the axle holes, the rollers being mounted for rotation on the axles and between the inner leg and the outer leg of each lower lateral channel;
the left rolling elements including left vertical rollers, the rollers each having a vertical axis of rotation and a hole through the axis, the left rolling elements having an axle for each roller, the inner leg and the outer leg of each left medial channel having collinear axle holes perpendicular to the channels, the axles being closely received in the axle holes, the rollers being mounted for rotation on the axles and between the inner leg and the outer leg of each left medial channel; and
the right rolling elements including right vertical rollers, the rollers each having a vertical axis of rotation and a hole through the axis, the right rolling elements having an axle for each roller, the inner leg and the outer leg of each right medial channel having collinear axle holes perpendicular to the channels, the axles being closely received in the axle holes, the rollers being mounted for rotation on the axles and between the inner leg and the outer leg of each right medial channel.

12. The roller mount for seats of claim 11, wherein the detent further comprises:
a shaft extending through the second carriage detent holes, through the second track slots, and through the first carriage detent hole;
the first and second detent collars each having a longitudinal hole therethrough for close collinear engagement with the shaft, the second detent collar being mounted in a fixed position on the shaft, the first detent collar being mounted in a fixed position on the shaft; and
a spring biasing the first detent collar into engagement with one of the first track detent bores, and the second detent collar into engagement with one of the second track detent bores.

13. The roller mount for seats of claim 12, wherein the detent further comprises:
a handle mounted on an end of the shaft, the handle being adapted for manual grasping;
the first track left and right track flanges each having a track slot therethrough extending longitudinally from adjacent the front end to adjacent the rear end, one of the left and right track flanges having the first track detent bores in the track slot;

the first carriage left and right carriage flanges each having a carriage detent hole therethrough;

a stop block having a proximal end mounted on the shaft, and extending upward to a distal end, the distal end having a flat juxtaposed with the top plate to preclude the shaft from rotating; and the spring having one end bearing against the stop block, the spring having an opposite end bearing against the second carriage.

14. The roller mount for seats of claim 13, wherein the detent further comprises:

the first detent collar being a cylinder with a diameter greater than that of the first track detent bores, the first detent collar having one end tapering to a frustrum of a cone for engagement with one of the first track detent bores; and the second detent collar being a cylinder with a diameter greater than that of the second track detent bores, the second detent collar having one end tapering to a frustrum of a cone for engagement with one of the second track detent bores.

15. A roller mount for seats for use in connection with a boat and a seat, the roller mount for seats comprising:

a base plate, the base plate being adapted for mounting in the boat;

a first track mounted on the base plate, the first track having a generally Y-shaped cross-section extending longitudinally between opposite front and rear ends, the first track having a transverse track web, the first track Y-shaped cross-section having opposite left and right track flanges extending upward from the track web, the left and right track flanges each having an upper edge and a lower edge, the left and right track flanges each having a track slot therethrough extending longitudinally from adjacent the front end to adjacent the rear end, one of the left and right track flanges having a plurality of first track detent bores in the track slot, the first track detent bores having a predetermined diameter, the first track having a central track pillar, the track pillar having a left side and a right side;

a first carriage partially surrounding the first track, and mounted for longitudinal rolling movement on the first track, the first carriage having a generally inverted U-shaped cross-section extending longitudinally between opposite front and rear ends, the first carriage having a transverse carriage web, the first carriage U-shaped cross-section having opposite left and right carriage flanges extending downward from the transverse carriage web, the left and right carriage flanges each having an upper edge and a lower edge, the left and right carriage flanges having a left and right carriage detent hole therethrough respectively, the first carriage having an upper right and an upper left lateral channel facing downward, a lower right and a lower left lateral channel facing upward, and a right and a left medial channel facing inward, each channel having an inner leg and an outer leg, each channel extending longitudinally between the carriage front and rear ends;

a plurality of upper rolling elements mounted on the first carriage for rolling engagement with the first track, the upper rolling elements being disposed bearing downward against the upper edges of the first track left and right track flanges, so as to resist downward forces against the first track, the upper rolling elements including upper right and upper left transverse rollers, the rollers each having a horizontal axis of rotation and a hole through the axis, the upper rolling elements having an axle for each roller, the inner leg and the outer leg of each upper lateral channel having collinear axle holes perpendicular to the channels, the axles being closely received in the axle holes, the rollers being mounted for rotation on the axles and between the inner leg and the outer leg of each upper lateral channel;

a plurality of lower rolling elements mounted on the first carriage for rolling engagement with the first track, the lower rolling elements being disposed bearing upward against the lower edges of the first track left and right track flanges, so as to resist upward forces against the first track, the lower rolling elements including lower right and lower left transverse rollers, the rollers each having a horizontal axis of rotation and a hole through the axis, the lower rolling elements having an axle for each roller, the inner leg and the outer leg of each lower lateral channel having collinear axle holes perpendicular to the channels, the axles being closely received in the axle holes, the rollers being mounted for rotation on the axles and between the inner leg and the outer leg of each lower lateral channel;

a plurality of left rolling elements mounted on the first carriage for rolling engagement with the first track, the left rolling elements being disposed bearing rightward against the first track pillar left side, so as to resist rightward forces against the first track, the left rolling elements including left vertical rollers, the rollers each having a vertical axis of rotation and a hole through the axis, the left rolling elements having an axle for each roller, the inner leg and the outer leg of each left medial channel having collinear axle holes perpendicular to the channels, the axles being closely received in the axle holes, the rollers being mounted for rotation on the axles and between the inner leg and the outer leg of each left medial channel;

a plurality of right rolling elements mounted on the first carriage for rolling engagement with the first track, the right rolling elements being disposed bearing leftward against the first track pillar right side, so as to resist leftward forces against the first track, the right rolling elements including right vertical rollers, the rollers each having a vertical axis of rotation and a hole through the axis, the right rolling elements having an axle for each roller, the inner leg and the outer leg of each right medial channel having collinear axle holes perpendicular to the channels, the axles being closely received in the axle holes, the rollers being mounted for rotation on the axles and between the inner leg and the outer leg of each right medial channel;

a detent, the detent having a first detent collar disposed for sliding movement in one of the left and right first carriage detent holes, the first detent collar being a cylinder with a diameter greater than that of the first track detent bores, the first detent collar having a conical end tapering to a frustrum of a cone, the first detent collar having a longitudinal hole therethrough, the detent having a shaft extending collinearly through the first detent collar, through one of the left and right first carriage detent holes, through the first track slots, and through the opposite one of the left and right first carriage detent holes, the detent having a spring biasing the first detent collar conical end into selective releasable engagement with one of the first track detent bores, the detent having a handle mounted on an end of the shaft, so as to preclude movement of the first carriage with respect to the first track when the first detent collar is engaged, and to allow movement of the first carriage with respect to the first track when the first detent collar is disengaged; and a top plate mounted on the first carriage, the top plate being adapted to support the seat.

16. The roller mount for seats of claim 15, further comprising a wear plate attached to the first track, the wear plate including the first track detent bores.

17. The roller mount for seats of claim 15, further comprising:

a second track mounted on the base plate parallel to the first track and spaced apart from the first track, the second track having a generally Y-shaped cross-section extending longitudinally between opposite front and rear ends, the second track having a transverse track web, the second track Y-shaped cross-section having opposite left and right track flanges extending upward from the track web, the left and right track flanges each having an upper edge and a lower edge, the left and right track flanges each having a track slot therethrough extending longitudinally from adjacent the front end to adjacent the rear end, one of the left and right track flanges having a plurality of second track detent bores in the track slot, the second track detent bores having the same diameter as the first track detent bores, the second track having a central track pillar, the track pillar having a left side and a right side;

a second carriage partially surrounding the second track, and mounted for longitudinal rolling movement on the second track, the second carriage having a generally inverted U-shaped cross-section extending longitudinally between opposite front and rear ends, the second carriage having a transverse carriage web, the second carriage U-shaped cross-section having opposite left and right carriage flanges extending downward from the transverse carriage web, the left and right carriage flanges each having an upper edge and a lower edge, the left and right carriage flanges having a left and right carriage detent hole therethrough respectively, the second carriage having an upper right and an upper left lateral channel facing downward, a lower right and a lower left lateral channel facing upward, and a right and a left medial channel facing inward, each channel having an inner leg and an outer leg, each channel extending longitudinally between the carriage front and rear ends;

a plurality of upper rolling elements mounted on the second carriage for rolling engagement with the second track, the upper rolling elements being disposed bearing downward against the upper edges of the second track left and right track flanges, so as to resist downward forces against the second track, the upper rolling elements including upper right and upper left transverse rollers, the rollers each having a horizontal axis of rotation and a hole through the axis, the upper rolling elements having an axle for each roller, the inner leg and the outer leg of each upper lateral channel having collinear axle holes perpendicular to the channels, the axles being closely received in the axle holes, the rollers being mounted for rotation on the axles and between the inner leg and the outer leg of each upper lateral channel;

a plurality of lower rolling elements mounted on the second carriage for rolling engagement with the second track, the lower rolling elements being disposed bearing upward against the lower edges of the second track left and right track flanges, so as to resist upward forces against the second track, the lower rolling elements including lower right and lower left transverse rollers, the rollers each having a horizontal axis of rotation and a hole through the axis, the lower rolling elements having an axle for each roller, the inner leg and the outer leg of each lower lateral channel having collinear axle holes perpendicular to the channels, the axles being closely received in the axle holes, the rollers being mounted for rotation on the axles and between the inner leg and the outer leg of each lower lateral channel;

a plurality of left rolling elements mounted on the second carriage for rolling engagement with the second track, the left rolling elements being disposed bearing rightward against the second track pillar left side, so as to resist rightward forces against the second track, the left rolling elements including left vertical rollers, the rollers each having a vertical axis of rotation and a hole through the axis, the left rolling elements having an axle for each roller, the inner leg and the outer leg of each left medial channel having collinear axle holes perpendicular to the channels, the axles being closely received in the axle holes, the rollers being mounted for rotation on the axles and between the inner leg and the outer leg of each left medial channel;

a plurality of right rolling elements mounted on the second carriage for rolling engagement with the second track, the right rolling elements being disposed bearing leftward against the second track pillar right side, so as to resist leftward forces against the second track, the right rolling elements including right vertical rollers, the rollers each having a vertical axis of rotation and a hole through the axis, the right rolling elements having an axle for each roller, the inner leg and the outer leg of each right medial channel having collinear axle holes perpendicular to the channels, the axles being closely received in the axle holes, the rollers being mounted for rotation on the axles and between the inner leg and the outer leg of each right medial channel;

the detent having a second detent collar disposed for sliding movement in one of the left and right second carriage detent holes, the second detent collar being a cylinder with a diameter greater than that of the second track detent bores, the second detent collar having a conical end tapering to a frustrum of a cone, the second detent collar having a longitudinal hole therethrough, the shaft extending collinearly through the second detent collar, through one of the left and right second carriage detent holes, through the second track slots, and through the opposite one of the left and right second carriage detent holes, the detent spring biasing the second detent collar conical end into selective releasable engagement with one of the second track detent bores, so as to preclude movement of the second carriage with respect to the second track when the second detent collar is engaged, and to allow movement of the second carriage with respect to the second track when the second detent collar is disengaged; and the top plate extending to the second carriage, and mounted on the second carriage.

18. The roller mount for seats of claim 17, wherein the detent further comprises:

the second detent collar being mounted in a fixed position on the shaft; and the first detent collar being mounted in a fixed position on the shaft, so that the first and second detent collars will engage and disengage substantially simultaneously.

19. The roller mount for seats of claim 18, wherein the detent further comprises a stop block having a proximal end mounted on the shaft, and extending upward to a distal end, the distal end having a flat juxtaposed with the top plate to preclude the shaft from rotating, the spring having one end bearing against the stop block, the spring having an opposite end bearing against the second carriage.

20. The roller mount for seats of claim 17, further comprising a wear plate attached to the second track, the wear plate including the second track detent bores.

* * * * *